US012713006B2

(12) United States Patent
Chen et al.

(10) Patent No.: US 12,713,006 B2
(45) Date of Patent: Aug. 18, 2026

(54) METHOD AND APPARATUS USING BOUNDARY MATCHING FOR OVERLAPPED BLOCK MOTION COMPENSATION IN VIDEO CODING SYSTEM

(71) Applicant: MEDIATEK INC., Hsinchu City (TW)

(72) Inventors: Chun-Chia Chen, Hsinchu City (TW); Olena Chubach, San Jose, CA (US); Chih-Wei Hsu, Hsinchu City (TW); Tzu-Der Chuang, Hsinchu City (TW); Ching-Yeh Chen, Hsinchu City (TW); Yu-Wen Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 47 days.

(21) Appl. No.: 18/727,004

(22) PCT Filed: Jan. 10, 2023

(86) PCT No.: PCT/CN2023/071688
§ 371 (c)(1),
(2) Date: Jul. 5, 2024

(87) PCT Pub. No.: WO2023/131347
PCT Pub. Date: Jul. 13, 2023

(65) Prior Publication Data

US 2025/0071260 A1 Feb. 27, 2025

Related U.S. Application Data

(60) Provisional application No. 63/297,854, filed on Jan. 10, 2022.

(51) Int. Cl.
*H04N 19/105* (2014.01)
*H04N 19/176* (2014.01)
*H04N 19/182* (2014.01)

(52) U.S. Cl.
CPC ......... *H04N 19/105* (2014.11); *H04N 19/176* (2014.11); *H04N 19/182* (2014.11)

(58) Field of Classification Search
CPC .. H04N 19/105; H04N 19/176; H04N 19/182; H04N 19/583
See application file for complete search history.

(56) References Cited

U.S. PATENT DOCUMENTS 9,445,118 B2 9/2016 Kim
11,616,966 B2 3/2023 Chiang
(Continued)

FOREIGN PATENT DOCUMENTS

CN 104935939 A 9/2015
CN 113661710 A 11/2021
(Continued)

OTHER PUBLICATIONS

International Search Report and Written Opinion dated Apr. 12, 2023, issued in application No. PCT/CN2023/071688.
(Continued)

*Primary Examiner* — Nasim N Nirjhar
(74) *Attorney, Agent, or Firm* — McClure, Qualey & Rodack, LLP

(57) ABSTRACT

A method and apparatus for video coding are disclosed. According to the method, a set of MC (Motion Compensation) candidates with each MC candidate comprising predicted samples for coding boundary pixels of the current block are determined. The set of MC candidates comprises a first candidate, and wherein the first candidate corresponds to a weighted sum of first predicted pixels generated according to first motion information of the current block and second predicted pixels generated according to second motion information of a neighbouring boundary block of the current block. Boundary matching costs associated with the
(Continued)

set of MC candidates are determined respectively. A final candidate is determined from the set of MC candidates based on the boundary matching costs. The current block is encoded or decoded using the final candidate.

10 Claims, 12 Drawing Sheets

(56) References Cited

U.S. PATENT DOCUMENTS

| | | | | |
|---|---|---|---|---|
| 2012/0128071 | A1* | 5/2012 | Celetto | H04N 19/192 375/E7.125 |
| 2017/0264904 | A1 | 9/2017 | Koval | |
| 2019/0387251 | A1* | 12/2019 | Lin | H04N 19/105 |
| 2020/0322623 | A1 | 10/2020 | Chiang | |
| 2024/0323353 | A1* | 9/2024 | Zhang | H04N 19/52 |

FOREIGN PATENT DOCUMENTS

| | | | |
|---|---|---|---|
| EP | 3443746 | B1 | 7/2021 |
| WO | 2019138998 | A1 | 7/2019 |

OTHER PUBLICATIONS

Chinese language office action dated Sep. 13, 2023, issued in application No. TW 112101020.

* cited by examiner 610
620
630
640

128 (luma)
128
710
720
730
740
750
760
770
780

Above Neighbor_A
Above Neighbor_B
Above Neighbor_C
Above Neighbor_D
Left Neighbor_A
Left Neighbor_E
Left Neighbor_F
Left Neighbor_G
A
B
C
D
E
F
G
1910

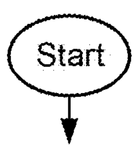

Receiving input data associated with a current block, wherein the input data comprise pixel data for the current block to be encoded at an encoder side or prediction residual data associated with the current block to be decoded at a decoder side — 2010

Determining a set of MC (Motion Compensation) candidates with each MC candidate comprising predicted samples for coding boundary pixels of the current block, wherein the set of MC candidates comprises a first candidate, and wherein the first candidate corresponds to a weighted sum of first predicted pixels generated according to first motion information of the current block and second predicted pixels generated according to second motion information of a neighbouring boundary block of the current block — 2020

Determining boundary matching costs associated with the set of MC candidates, wherein each of the boundary matching costs is determined, for one target candidate of the set of MC candidates, between reconstructed or predicted samples of the current block determined according to said one target candidate and neighbouring reconstructed samples of one or more neighbouring blocks of the current block — 2030

Determining a final candidate from the set of MC candidates based on the boundary matching costs — 2040

Encoding or decoding the current block using the final candidate — 2050

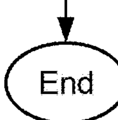

*Fig. 20*

METHOD AND APPARATUS USING BOUNDARY MATCHING FOR OVERLAPPED BLOCK MOTION COMPENSATION IN VIDEO CODING SYSTEM

CROSS REFERENCE TO RELATED APPLICATIONS

The present invention is a non-Provisional Application of and claims priority to U.S. Provisional Patent Application No. 63/297,854, filed on Jan. 10, 2022. The U.S. Provisional Patent Application is hereby incorporated by reference in its entirety.

FIELD OF THE INVENTION

The present invention relates to video coding system. In particular, the present invention relates to OBMC (Overlapped Block Motion Compensation) coding tool using boundary matching in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Among various new coding tools, some coding tools relevant to the present invention are reviewed as follows.

Partitioning of the CTUs Using a Tree Structure

In HEVC, a CTU is split into CUs by using a quaternary-tree (QT) structure denoted as coding tree to adapt to various local characteristics. The decision whether to code a picture area using inter-picture (temporal) or intra-picture (spatial) prediction is made at the leaf CU level. Each leaf CU can be further split into one, two or four Pus according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 2, there are four splitting types in multi-type tree structure, vertical binary splitting (SPLIT_BT_VER 210), horizontal binary splitting (SPLIT_BT_HOR 220), vertical ternary splitting (SPLIT_TT_VER 230), and horizontal ternary splitting (SPLIT_TT_HOR 240). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the color component of the CU.

FIG. 3 illustrates the signalling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 1.

TABLE 1

MttSplitMode derviation based on multi-type tree syntax elements

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 4 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum size chroma CB consist of 16 chroma samples.

In VVC, the maximum supported luma transform size is 64×64 and the maximum supported chroma transform size is 32×32. When the width or height of the CB is larger the maximum transform width or height, the CB is automatically split in the horizontal and/or vertical direction to meet the transform size restriction in that direction.

The following parameters are defined and specified by SPS syntax elements for the quadtree with nested multi-type tree coding tree scheme.

CTU size: the root node size of a quaternary tree

MinQTSize: the minimum allowed quaternary tree leaf node size

MaxBtSize: the maximum allowed binary tree root node size

MaxTtSize: the maximum allowed ternary tree root node size

MaxMttDepth: the maximum allowed hierarchy depth of multi-type tree splitting from a quadtree leaf MinBtSize: the minimum allowed binary tree leaf node size MinTtSize: the minimum allowed ternary tree leaf node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinBtSize and MinTtSize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node could be further partitioned by the multi-type tree. Therefore, the quaternary tree leaf node is also the root node for the multi-type tree and it has multi-type tree depth (mttDepth) as 0. When the multi-type tree depth reaches MaxMttDepth (i.e., 4), no further splitting is considered. When the multi-type tree node has width equal to MinBtSize and smaller or equal to 2*MinTtSize, no further horizontal splitting is considered. Similarly, when the multi-type tree node has height equal to MinBtSize and smaller or equal to 2*MinTtSize, no further vertical splitting is considered.

To allow 64×64 Luma block and 32×32 Chroma pipelining design in VVC hardware decoders, TT split is forbidden when either width or height of a luma coding block is larger than 64, as shown in FIG. 5, where block 500 corresponds to a 128×128 luma CU. The CU can be split using vertical binary partition (510) or horizontal binary partition (520). After the block is split into 4 CUs, each size is 64×64, the CU can be further partitioned using partitions including TT. For example, the upper-left 64×64 CU is partitioned using vertical ternary splitting (530) or horizontal ternary splitting (540). TT split is also forbidden when either width or height of a chroma coding block is larger than 32.

In VVC, the coding tree scheme supports the ability for the luma and chroma to have a separate block tree structure. For P and B slices, the luma and chroma CTBs in one CTU have to share the same coding tree structure. However, for I slices, the luma and chroma can have separate block tree structures. When the separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three color components unless the video is monochrome.

CU Splits on Picture Boundaries

As done in HEVC, when a portion of a tree node block exceeds the bottom or right picture boundary, the tree node block is forced to be split until the all samples of every coded CU are located inside the picture boundaries. The following splitting rules are applied in the VVC:

- If any portion of a tree node block exceeds the bottom or the right picture boundaries, and any of QT, BT and TT splitting is not allowed due to block size restriction, the block is forced to be split with QT split mode.
- Otherwise if a portion of a tree node block exceeds both the bottom and the right picture boundaries,
  - If the block is a QT node and the size of the block is larger than the minimum QT size, the block is forced to be split with QT split mode.
  - Otherwise, the block is forced to be split with SPLIT_BT_HOR mode
- Otherwise if a portion of a tree node block exceeds the bottom picture boundaries,
  - If the block is a QT node, and the size of the block is larger than the minimum QT size, and the size of the block is larger than the maximum BT size, the block is forced to be split with QT split mode.
  - Otherwise, if the block is a QT node, and the size of the block is larger than the minimum QT size and the size of the block is smaller than or equal to the maximum BT size, the block is forced to be split with QT split mode or SPLIT_BT_HOR mode.
  - Otherwise (the block is a BTT node or the size of the block is smaller than or equal to the minimum QT size), the block is forced to be split with SPLIT_BT_HOR mode.
- Otherwise if a portion of a tree node block exceeds the right picture boundaries,
  - If the block is a QT node, and the size of the block is larger than the minimum QT size, and the size of the block is larger than the maximum BT size, the block is forced to be split with QT split mode.
  - Otherwise, if the block is a QT node, and the size of the block is larger than the minimum QT size and the size of the block is smaller than or equal to the maximum BT size, the block is forced to be split with QT split mode or SPLIT_BT_VER mode.
  - Otherwise (the block is a BTT node or the size of the block is smaller than or equal to the minimum QT size), the block is forced to be split with SPLIT_BT_VER mode.

Restrictions on Redundant CU Splits

The quadtree with nested multi-type tree coding block structure provides a highly flexible block partitioning structure. Due to the types of splits supported the multi-type tree, different splitting patterns could potentially result in the same coding block structure. In VVC, some of these redundant splitting patterns are disallowed.

FIG. 6 illustrates the redundant splitting patterns of binary tree splits and ternary tree splits. As shown in FIG. 6, two levels of consecutive binary splits in one direction (vertical 610 and horizontal 630) could have the same coding block structure as a ternary tree split (vertical 620 and horizontal 640) followed by a binary tree split of the central partition. In this case, the binary tree split (in the given direction) for the central partition of a ternary tree split is prevented by the syntax. This restriction applies for CUs in all pictures.

When the splits are prohibited as described above, signalling of the corresponding syntax elements is modified to account for the prohibited cases. For example, when any case in FIG. 6 is identified (i.e. the binary split is prohibited for a CU of a central partition), the syntax element mtt_split_cu_binary_flag which specifies whether the split is a binary split or a ternary split is not signalled and is instead inferred to be equal to 0 by the decoder.

Virtual Pipeline Data Units (VPDUs)

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In order to keep the VPDU size as 64×64 luma samples, the following normative partition restrictions (with syntax signalling modification) are applied in VTM, as shown in FIG. 7:

- TT split is not allowed (as indicated by "X" in FIG. 7) for a CU with either width or height, or both width and height equal to 128.
- For a 128×N CU with N≤64 (i.e. width equal to 128 and height smaller than 128), horizontal BT is not allowed.

For an N×128 CU with N≤64 (i.e. height equal to 128 and width smaller than 128), vertical BT is not allowed. In FIG. 7, the luma block size is 128×128. The dashed lines indicate block size 64×64. According to the constraints mentioned above, examples of the partitions not allowed are indicated by "X" as shown in various examples (710-780) in FIG. 7.

Intra Chroma Partitioning and Prediction Restriction

In typical hardware video encoders and decoders, processing throughput drops when a picture has more small intra blocks because of sample processing data dependency between neighbouring intra blocks. The predictor generation of an intra block requires top and left boundary reconstructed samples from neighbouring blocks. Therefore, intra prediction has to be sequentially processed block by block.

In HEVC, the smallest intra CU is 8×8 luma samples. The luma component of the smallest intra CU can be further split into four 4×4 luma intra prediction units (Pus), but the chroma components of the smallest intra CU cannot be further split. Therefore, the worst case hardware processing throughput occurs when 4×4 chroma intra blocks or 4×4 luma intra blocks are processed. In VVC, in order to improve worst case throughput, chroma intra CBs smaller than 16 chroma samples (size 2×2, 4×2, and 2×4) and chroma intra CBs with width smaller than 4 chroma samples (size 2×N) are disallowed by constraining the partitioning of chroma intra CBs.

In single coding tree, a smallest chroma intra prediction unit (SCIPU) is defined as a coding tree node whose chroma block size is larger than or equal to 16 chroma samples and has at least one child luma block smaller than 64 luma samples, or a coding tree node whose chroma block size is not 2×N and has at least one child luma block 4×N luma samples. It is required that in each SCIPU, all CBs are inter, or all CBs are non-inter, i.e., either intra or intra block copy (IBC). In case of a non-inter SCIPU, it is further required that chroma of the non-inter SCIPU shall not be further split and luma of the SCIPU is allowed to be further split. In this way, the small chroma intra CBs with size less than 16 chroma samples or with size 2×N are removed. In addition, chroma scaling is not applied in case of a non-inter SCIPU. Here, no additional syntax is signalled, and whether a SCIPU is non-inter can be derived by the prediction mode of the first luma CB in the SCIPU. The type of a SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one flag before parsing the CUs in the SCIPU.

For the dual tree in intra picture, the 2×N intra chroma blocks are removed by disabling vertical binary and vertical ternary splits for 4×N and 8×N chroma partitions, respectively. The small chroma blocks with sizes 2×2, 4×2, and 2×4 are also removed by partitioning restrictions.

In addition, a restriction on picture size is considered to avoid 2×2/2×4/4×2/2×N intra chroma blocks at the corner of pictures by considering the picture width and height to be multiple of max(8, MinCbSize Y).

Intra Mode Coding With 67 Intra Prediction Modes

To capture the arbitrary edge directions presented in natural video, the number of directional intra modes in VVC is extended from 33, as used in HEVC, to 65. The new directional modes not in HEVC are also depicted in, FIG. 8 and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

To keep the complexity of the most probable mode (MPM) list generation low, an intra mode coding method with 6 MPMs is used by considering two available neighbouring intra modes. The following three aspects are considered to construct the MPM list:

- Default intra modes
- Neighbouring intra modes
- Derived intra modes.

A unified 6-MPM list is used for intra blocks irrespective of whether MRL and ISP coding tools are applied or not. The MPM list is constructed based on intra modes of the left and above neighbouring block. Suppose the mode of the left is denoted as Left and the mode of the above block is denoted as Above, the unified MPM list is constructed as follows:

- When a neighbouring block is not available, its intra mode is set to Planar by default.
- If both modes Left and Above are non-angular modes:
  - MPM list→{Planar, DC, V, H, V−4, V+4}
- If one of modes Left and Above is angular mode, and the other is non-angular:
  - Set a mode Max as the larger mode in Left and Above
  - MPM list→{Planar, Max, DC, Max−1, Max+1, Max−2}
- If Left and Above are both angular and they are different:
  - Set a mode Max as the larger mode in Left and Above
  - if the difference of mode Left and Above is in the range of 2 to 62, inclusive
    - MPM list→{Planar, Left, Above, DC, Max−1, Max+1}
  - Otherwise
    - MPM list→{Planar, Left, Above, DC, Max−2, Max+2}
- If Left and Above are both angular and they are the same:
  - MPM list→{Planar, Left, Left−1, Left+1, DC, Left−2}

Besides, the first bin of the MPM index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

To support these prediction directions, the top reference with length 2W+1, and the left reference with length 2H+1, are defined as shown in FIG. 9A and FIG. 9B respectively.

The number of replaced modes in wide-angular direction mode depends on the aspect ratio of a block. The replaced intra prediction modes are illustrated in Table 2.

TABLE 2

Intra prediction modes replaced by wide-angular modes

| Aspect ratio | Replaced intra prediction modes |
|---|---|
| W/H == 16 | Modes 12, 13, 14, 15 |
| W/H == 8 | Modes 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == ½ | Modes 61, 62, 63, 64, 65, 66 |
| W/H == ¼ | Mode 57, 58, 59, 60, 61, 62, 63, 64, 65, 66 |
| W/H == ⅛ | Modes 55, 56 |
| W/H == 1/16 | Modes 53, 54, 55, 56 |

As shown in FIG. 10, two vertically-adjacent predicted samples (samples 1010 and 1012) may use two non-adjacent reference samples (samples 1020 and 1022) in the case of wide-angle intra prediction. Hence, low-pass reference samples filter and side smoothing are applied to the wide-angle prediction to reduce the negative effect of the increased gap $\Delta p_\alpha$. If a wide-angle mode represents a non-fractional offset. There are 8 modes in the wide-angle modes satisfy this condition, which are [−14, −12, −10, −6, 72, 76, 78, 80]. When a block is predicted by these modes, the samples in the reference buffer are directly copied without applying any interpolation. With this modification, the number of samples needed to be smoothing is reduced. Besides, it aligns the design of non-fractional modes in the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135° and above 45°, luma intra prediction modes ranging from 2 to 5 are mapped to 2. Therefore, chroma DM derivation table for 4:2:2: chroma format is updated by replacing some values of the entries of the mapping table to convert prediction angle more precisely for chroma blocks.

Mode Dependent Intra Smoothing (MDIS)

Four-tap intra interpolation filters are utilized to improve the directional intra prediction accuracy. In HEVC, a two-tap linear interpolation filter has been used to generate the intra prediction block in the directional prediction modes (i.e., excluding Planar and DC predictors). In VVC, simplified 6-bit 4-tap Gaussian interpolation filter is used for only directional intra modes. Non-directional intra prediction process is unmodified. The selection of the 4-tap filters is performed according to the MDIS condition for directional intra prediction modes that provide non-fractional displacements, i.e. to all the directional modes excluding the following modes: 2, HOR_IDX, DIA_IDX, VER_IDX, 66.

Depending on the intra prediction mode, the following reference samples processing is performed:

The directional intra-prediction mode is classified into one of the following groups:

vertical or horizontal modes (HOR_IDX, VER_IDX), diagonal modes that represent angles which are multiple of 45° (2, DIA_IDX, VDIA_IDX), remaining directional modes;

If the directional intra-prediction mode is classified as belonging to group A, then then no filters are applied to reference samples to generate predicted samples;

Otherwise, if a mode falls into group B, then a [1, 2, 1] reference sample filter may be applied (depending on the MDIS condition) to reference samples to further copy these filtered values into an intra predictor according to the selected direction, but no interpolation filters are applied;

Otherwise, if a mode is classified as belonging to group C, then only an intra reference sample interpolation filter is applied to reference samples to generate a predicted sample that falls into a fractional or integer position between reference samples according to a selected direction (no reference sample filtering is performed).

Cross-Component Linear Model (CCLM) Prediction

To reduce the cross-component redundancy, a cross-component linear model (CCLM) prediction mode is used in the VVC, for which the chroma samples are predicted based on the reconstructed luma samples of the same CU by using a linear model as follows:

$$pred_C(i, j) = \alpha \cdot rec'_L(i, j) + \beta \tag{1}$$

where $pred_C(i, j)$ represents the predicted chroma samples in a CU and $rec_L(i, j)$ represents the downsampled reconstructed luma samples of the same CU.

The CCLM parameters (α and β) are derived with at most four neighbouring chroma samples and their corresponding down-sampled luma samples. Suppose the current chroma block dimensions are W×H, then W' and H' are set as W'=W, H'=H when LM mode is applied;

W'=W+H when LM-A mode is applied;

H'=H+W when LM-L mode is applied;

The above neighbouring positions are denoted as S[0, −1] . . . . S[W'−1, −1] and the left neighbouring positions are denoted as S[−1, 0] . . . . S[−1, H'−1]. Then the four samples are selected as S[W'/4, −1], S[3*W'/4, −1], S[−1, H'/4], S[−1, 3*H'/4] when LM mode is applied and both above and left neighbouring samples are available;

S[W'/8, −1], S[3*W'/8, −1], S[5*W'/8, −1], S[7*W'/8, −1] when LM-A mode is applied or only the above neighbouring samples are available;

S[−1, H'/8], S[−1, 3*H'/8], S[−1, 5*H'/8], S[−1, 7*H'/8] when LM-L mode is applied or only the left neighbouring samples are available;

The four neighbouring luma samples at the selected positions are down-sampled and compared four times to find two smaller values: $x^0_A$ and $x^1_A$, and two larger values: $x^0_B$ and $x^1_B$. Their corresponding chroma sample values are denoted as $y^0_A$, $y^1_A$, $y^0_B$ and $y^1_B$. Then $x_A$, $x_B$, $y_A$ and $y_B$ are derived as:

$$Xa = (x0A + x1A + 1) >> 1; \tag{2}$$

$$Xb = (x0B + x1B + 1) >> 1;$$

$$Ya = (y0A + y1A + 1) >> 1;$$

$$Yb = (y0B + y1B + 1) >> 1$$

Finally, the linear model parameters α and β are obtained according to the following equations.

$$\alpha = \frac{Y_a - Y_b}{X_a - X_b} \tag{3}$$

$$\beta = Y_b - \alpha \cdot X_b \tag{4}$$

FIG. 11 shows an example of the location of the left and above samples and the sample of the current block involved in the CCLM mode. FIG. 11 shows the relative sample locations of N×N chroma block 1110, the corresponding 2N×2N luma block 1120 and their neighbouring samples (shown as filled circles).

The division operation to calculate parameter a is implemented with a look-up table. To reduce the memory required for storing the table, the diff value (difference between maximum and minimum values) and the parameter a are expressed by an exponential notation. For example, diff is approximated with a 4-bit significant part and an exponent. Consequently, the table for 1/diff is reduced into 16 elements for 16 values of the significand as follows:

$$DivTable[\,] = \{0, 7, 6, 5, 5, 4, 4, 3, 3, 2, 2, 1, 1, 1, 1, 0\} \tag{5}$$

This would have a benefit of both reducing the complexity of the calculation as well as the memory size required for storing the needed tables.

Besides the above template and left template can be used to calculate the linear model coefficients together, they also can be used alternatively in the other 2 LM modes, called LM_A, and LM_L modes.

In LM_A mode, only the above template is used to calculate the linear model coefficients. To get more samples, the above template is extended to (W+H). In LM_L mode, only left template are used to calculate the linear model coefficients. To get more samples, the left template is extended to (H+W).

For a non-square block, the above template is extended to W+W, the left template are extended to H+H.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

$$Rec'_L(i,j) = [rec_L(2i-1,2j-1) + 2\cdot rec_L(2i-1,2j-1) + rec_L(2i+1,2j-1) + rec_L(2i-1,2j) + 2\cdot rec_L(2i,2j) + rec_L(2i+1,2j) + 4] >> 3 \quad (6)$$

$$Rec'_L(i,j) = rec_L(2i,2j-1) + rec_L(2i-1,2j) + 4\cdot rec_L(2i,2j) + rec_L(2i+1,2j) + rec_L(2i,2j+1) + 4] >> 3 \quad (7)$$

Note that only one luma line (general line buffer in intra prediction) is used to make the down-sampled luma samples when the upper reference line is at the CTU boundary.

This parameter computation is performed as part of the decoding process, and is not just as an encoder search operation. As a result, no syntax is used to convey the α and β values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table-3. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 3

Derivation of chroma prediction mode from luma mode when cclm_is enabled

| Chroma prediction mode | Corresponding luma intra prediction mode | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 4.

TABLE 4

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 4, the first bin indicates whether it is regular (0) or LM modes (1). If it is LM mode, then the next bin indicates whether it is LM_CHROMA (0) or not. If it is not LM_CHROMA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in Table 4 are context coded with its own context model, and the rest bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node are allowed to use CCLM in the following way:

If the 32×32 chroma node is not split or partitioned QT split, all chroma CUs in the 32×32 node can use CCLM If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

Position Dependent Intra Prediction Combination

In VVC, the results of intra prediction of DC, planar and several angular modes are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signalling: planar, DC, horizontal, vertical, bottom-left angular mode and its eight adjacent angular modes, and top-right angular mode and its eight adjacent angular modes.

The prediction sample pred (x',y') is predicted using an intra prediction mode (DC, planar, angular) and a linear combination of reference samples according to the Eqn. (8) as follows:

$$pred(x',y') = (wL \times R_{-1,y'} + wT \times R_{x',-1} - wTL \times R_{-1,-1} + (64 - wL - wT + wTL) \times pred(x',y') + 32) >> 6 \quad (8)$$

where $R_{x,-1}$, $R_{-1,y}$ represent the reference samples located at the top and left boundaries of current sample (x, y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters. PDPC process for DC and Planar modes is identical and clipping operation is avoided. For angular modes, PDPC scale factor is adjusted such that range check is not needed and condition on angle to enable PDPC is removed (scale>=0 is used). In addition, PDPC weight is based on 32 in all angular mode cases. The PDPC weights are dependent on prediction modes and are shown in Table 5. PDPC is applied to the block with both width and height greater than or equal to 4.

TABLE 5

Example of PDPC weights according to prediction modes

| Prediction modes | wT | wL | wTL |
|---|---|---|---|
| Diagonal top-right | 16 >> ( ( y '<<1 ) >> shift) | 16 >> ( ( x '<<1 ) >> shift) | 0 |
| Diagonal bottom-left | 16 >> ( ( y '<<1 ) >> shift ) | 16 >> ( ( x '<<1 ) >> shift ) | 0 |
| Adjacent diagonal top-right | 32 >> ( ( y '<<1 ) >> shift ) | 0 | 0 |
| Adjacent diagonal bottom-left | 0 | 32 >> ( ( x '<<1 ) >> shift ) | 0 |

FIGS. 12A-D illustrate the definition of reference samples ($R_{x,-1}$, $R_{-1,y}$ and $R_{-1,-1}$) for PDPC applied over various prediction modes, where FIG. 12A corresponds to the diagonal top-right mode, FIG. 12B corresponds to the diagonal bottom-left mode, FIG. 12C corresponds to the adjacent diagonal top-right mode and FIG. 12D corresponds to the adjacent diagonal bottom-left mode. The prediction sample pred (x',y') is located at (x',y') within the prediction block. As an example, the coordinate x of the reference sample $R_{x,-1}$ is given by: x=x'+y'+1, and the coordinate y of the reference sample $R_{-1,y}$ is similarly given by: y=x'+y'+1 for the diagonal modes. For the other annular mode, the reference samples $R_{x,-1}$ and $R_{-1,y}$ could be located in fractional sample position. In this case, the sample value of the nearest integer sample location is used.

Multiple Reference Line Intra Prediction

Multiple Reference Line (MRL) intra prediction uses more reference lines for intra prediction. In FIG. 13, an example of 4 reference lines is depicted, where the samples of segments A and F are not fetched from reconstructed neighbouring samples but padded with the closest samples from segments B and E, respectively. HEVC intra-picture prediction uses the nearest reference line (i.e., reference line 0). In MRL, 2 additional lines (reference line 1 and reference line 3) are used.

The index of selected reference line (mrl_idx) is signalled and used to generate intra predictor. For reference line idx, which is greater than 0, only include additional reference line modes in MPM list and only signal mpm index without remaining mode. The reference line index is signalled before intra prediction modes, and Planar mode is excluded from intra prediction modes in case that a nonzero reference line index is signalled.

MRL is disabled for the first line of blocks inside a CTU to prevent using extended reference samples outside the current CTU line. Also, PDPC (Position-Dependent Prediction Combination) is disabled when an additional line is used. For MRL mode, the derivation of DC value in DC intra prediction mode for non-zero reference line indices is aligned with that of reference line index 0. MRL requires the storage of 3 neighbouring luma reference lines with a CTU to generate predictions. The Cross-Component Linear Model (CCLM) tool also requires 3 neighbouring luma reference lines for its down-sampling filters. The definition of MRL to use the same 3 lines is aligned with CCLM to reduce the storage requirements for decoders.

Bi-Prediction With CU-Level Weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi-pred} = ((8 - w) * P_0 + w * P_1 + 4) >> 3 \tag{9}$$

Five weights are allowed in the weighted averaging bi-prediction, w∈{−2, 3, 4, 5, 10}. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights (w∈{3,4,5}) are used.

At the encoder, fast search algorithms are applied to find the weight index without significantly increasing the encoder complexity. These algorithms are summarized as follows. Further details can be found in the VTM software and document JVET-L0646 (Yu-Chi Su, et. al., "CE4-related: Generalized bi-prediction improvements combined from JVET-L0197 and JVET-L0296", Joint Video Experts Team (JVET) of ITU-T SG 16 WP 3 and ISO/IEC JTC 1/SC 29, 12th Meeting: Macao, CN, 3-12 Oct. 2018, Document: JVET-L0646). When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g. equal weight.

Joint Video Expert Team (JVET) of ITU-T SG16 WP3 and ISO/IEC JTC1/SC29/WG11 are currently in the process of exploring the next-generation video coding standard. Some promising new coding tools have been adopted into Enhanced Compression Model 2 (ECM 2) (M. Coban, et al., "Algorithm description of Enhanced Compression Model 2 (ECM 2)," Joint Video Expert Team (JVET) of ITU-T SG 16 WP 3 and ISO/IEC JTC 1/SC 29, 23rd Meeting, by teleconference, 7-16 Jul. 2021, Doc. JVET-W2025) to further improve VVC. The adopted new tools have been implemented in the reference software ECM-2.0 (ECM reference software ECM-2.0). Particularly, a new method for jointly predicting a collection of signs of transform coefficient levels in a residual transform block has been developed (JVET-D0031, Felix Henry, et al., "Residual Coefficient Sign Prediction", Joint Video Expert Team (JVET) of ITU-T SG 16 WP 3 and ISO/IEC JTC 1/SC 29, 4th Meeting: Chengdu, CN, 15-21 Oct. 2016, Doc. JVET-D0031). In ECM 2, to derive a best sign prediction hypothesis for a residual transform block, a cost function is defined as discontinuity measure across block boundaries shown on FIG. 14, where block 1410 corresponds to a transform block, circles 1420 and 1422 correspond to neighbouring samples and circles 1430 and 1432 correspond to reconstructed samples associated with sign candidates of block 1410. The cost function is defined as a sum of absolute second derivatives in the residual domain for the above row and left column as follows:

$$5\ \text{cost} = \sum_{x=0}^{w-1} |(-R_{x,-2} + 2R_{x,-1} - P_{x,0}) - r_{x,0}| + \sum_{y=0}^{h-1} |(-R_{-2,y} + 2R_{-1,y} - P_{0,y}) - r_{0,y}| \quad (10)$$

In the above equation, R is reconstructed neighbours, P is prediction of the current block, and r is the residual hypothesis. The allowed maximum number of the predicted signs $N_{sp}$ for each sign prediction hypothesis in a transform block is signalled in the sequence parameter set (SPS) and is constrained to be less than or equal to 8 in ECM-2.0. The cost function is measured for all hypotheses, and the one with the smallest cost is selected as a predictor for coefficient signs. Only signs of coefficients from the top-left 4×4 transform subblock region (with lowest frequency coefficients) in a transform block are allowed to be included into the hypothesis. The signs of first $N_{sp}$ non-zero coefficients (if available) are collected and coded according to a raster-scan order over the top-left 4×4 subblock. For those predicted coefficients, instead of the coefficient sign, a sign prediction bin indicating whether the predicted sign is equal to the selected hypothesis is signalled. This sign prediction bin is context coded, where the selected context is derived from whether a coefficient is DC or not. The contexts are separated for intra and inter blocks, and for luma and chroma components. For those other coefficients without sign prediction, the corresponding signs are coded by CABAC in the bypass mode.

Joint Coding of Chroma Residuals

VVC supports the joint coding of chroma residual (JCCR) tool, where the chroma residuals are coded jointly. The usage (activation) of the JCCR mode is indicated by a TU-level flag tu_joint_cher_residual_flag and the selected mode is implicitly indicated by the chroma CBFs. The flag tu_joint_cher_residual_flag is present if either or both chroma CBFs for a TU are equal to 1. In the PPS (Picture Parameter Set) and slice header, chroma QP offset values are signalled for the JCCR mode to differentiate from the usual chroma QP offset values signalled for regular chroma residual coding mode. These chroma QP offset values are used to derive the chroma QP values for some blocks coded using the JCCR mode. The JCCR mode has 3 sub-modes. When a corresponding JCCR sub-mode (sub-mode 2 in Table 1) is active in a TU, this chroma QP offset is added to the applied luma-derived chroma QP during quantization and decoding of that TU. For the other JCCR sub-modes (sub-modes 1 and 3 Table 6), the chroma QPs are derived in the same way as for conventional Cb or Cr blocks. The reconstruction process of the chroma residuals (resCb and resCr) from the transmitted transform blocks is depicted in Table 1. When the JCCR mode is activated, one single joint chroma residual block (resJointC[x] [y] in Table 1) is signalled, and residual block for Cb (resCb) and residual block for Cr (resCr) are derived considering information such as tu_cbf_cb, tu_cbf_cr, and CSign, which is a sign value specified in the slice header.

At the encoder side, the joint chroma components are derived as explained in the following. Depending on the mode (listed in the tables above), resJointC{1,2} are generated by the encoder as follows:

If mode is equal to 2 (single residual with reconstruction Cb=C, Cr=CSign*C), the joint residual is determined according to $$resJointC[x][y] = (resCb[x][y] + CSign * resCr[x][y]/2$$

Otherwise, if mode is equal to 1 (single residual with reconstruction Cb=C, Cr=(CSign*C)/2), the joint residual is determined according to $$resJointC[x][y] = (4 * resCb[x][y] + 2 * CSign * resCr[x][y])/5$$

Otherwise (mode is equal to 3, i. e., single residual, reconstruction Cr=C, Cb=(CSign*C)/2), the joint residual is determined according to $$resJointC[x][y] = (4 * resCr[x][y] + 2 * CSign * resCb[x][y])/5$$

TABLE 6

Reconstruction of chroma residuals. The value CSign is a sign value (+1 or −1), which is specified in the slice header, resJointC[ ][ ] is the transmitted residual.

| tu_cbf_cb | tu_cbf_cr | reconstruction of Cb and Cr residuals | mode |
|---|---|---|---|
| 1 | 0 | resCb[ x ][ y ] = resJointC[ x ][ y ]<br>resCr[ x ][ y ] = ( CSign * resJointC[ x ][ y ] ) >> 1 | 1 |
| 1 | 1 | resCb[ x ][ y ] = resJointC[ x ][ y ]<br>resCr[ x ][ y ] = CSign * resJointC[ x ][ y ] | 2 |
| 0 | 1 | resCb[ x ][ y ] = ( CSign * resJointC[ x ][ y ] ) >> 1<br>resCr[ x ][ y ] = resJointC[ x ][ y ] | 3 |

The three joint chroma coding sub-modes described above are only supported in I slices. In P and B slices, only mode 2 is supported. Hence, in P and B slices, the syntax element tu_joint_cbcr_residual_flag is only present if both chroma cbfs are 1.

The JCCR mode can be combined with the chroma transform skip (TS) mode (more details of the TS mode can be found in Section 3.9.3 of JVET-T2002). To speed up the encoder decision, the JCCR transform selection depends on whether the independent coding of Cb and Cr components selects the DCT-2 or the TS as the best transform, and whether there are non-zero coefficients in independent chroma coding. Specifically, if one chroma component selects DCT-2 (or TS) and the other component is all zero, or both chroma components select DCT-2 (or TS), then only DCT-2 (or TS) will be considered in JCCR encoding. Otherwise, if one component selects DCT-2 and the other selects TS, then both, DCT-2 and TS, will be considered in JCCR encoding.

BRIEF SUMMARY OF THE INVENTION

A method and apparatus for video coding are disclosed. According to the method, input data associated with a current block are received, wherein the input data comprise pixel data for the current block to be encoded at an encoder side or prediction residual data associated with the current block to be decoded at a decoder side. A set of MC (Motion Compensation) candidates with each MC candidate comprising predicted samples for coding boundary pixels of the current block are determined, wherein the set of MC candidates comprises a first candidate, and wherein the first candidate corresponds to a weighted sum of first predicted pixels generated according to first motion information of the current block and second predicted pixels generated according to second motion information of a neighbouring boundary block of the current block. Boundary matching costs associated with the set of MC candidates are determined, wherein each of the boundary matching costs is determined, for one target candidate of the set of MC candidates, between reconstructed or predicted samples of the current block determined according to said one target candidate and neighbouring reconstructed samples of one or more neighbouring blocks of the current block. A final candidate is determined from the set of MC candidates based on the boundary matching costs. The current block is encoded or decoded using the final candidate.

In one embodiment, the current block corresponds to a subblock in a top-most boundary of a CU (Coding Unit) enclosing the current block and the neighbouring boundary block of the current block corresponds to an above neighbouring block above the current block. In another embodiment, the current block corresponds to a subblock in a left-most boundary of a CU (Coding Unit) enclosing the current block, and the neighbouring boundary block of the current block corresponds to a left neighbouring block to the left of the current block.

In one embodiment, the set of MC candidates further comprises a second candidate corresponding to the first predicted pixels. In another embodiment, the set of MC candidates further comprises a third candidate corresponding to the second predicted pixels. In yet another embodiment, the set of MC candidates further comprises a second candidate corresponding to the first predicted pixels and a third candidate corresponding to the second predicted pixels.

In one embodiment, the set of MC candidates comprises multiple first MC candidates corresponding to multiple weightings for the weighted sum. In another embodiment, the set of MC candidates comprises multiple first MC candidates corresponding to different number of lines for the boundary pixels of the current block. In yet another embodiment, the set of MC candidates comprises multiple first MC candidates corresponding to multiple weightings for the weighted sum and different number of lines for the boundary pixels of the current block.

BRIEF DESCRIPTION OF THE DRAWINGS

FIG. 20 illustrates a flowchart of an exemplary video coding system that utilizes boundary matching-based OBMC (Overlapped Block Motion Compensation) according to an embodiment of the present invention.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

During the development of the current emerging international video standard, more and more coding modes have been proposed. Often, selected coding modes need to be signalled so that a decode can use the same coding modes. With the increased coding modes, it requires more data to signal syntax elements associated with the coding modes. Therefore, it is desirable to develop techniques to reduce or even eliminate the required data for signalling the associated syntax elements. The boundary matching technique used for joint sign coding of transform coefficients used in ECM2.0 illustrates a technique that both the encoder and decoder can perform the same cost evaluation based on neighbouring data to select a sign combination for a smallest cost function. In the present invention, block boundary matching methods are used to improve the performance.

Additional Angles for Boundary Smoothness Measure

Figure 15:
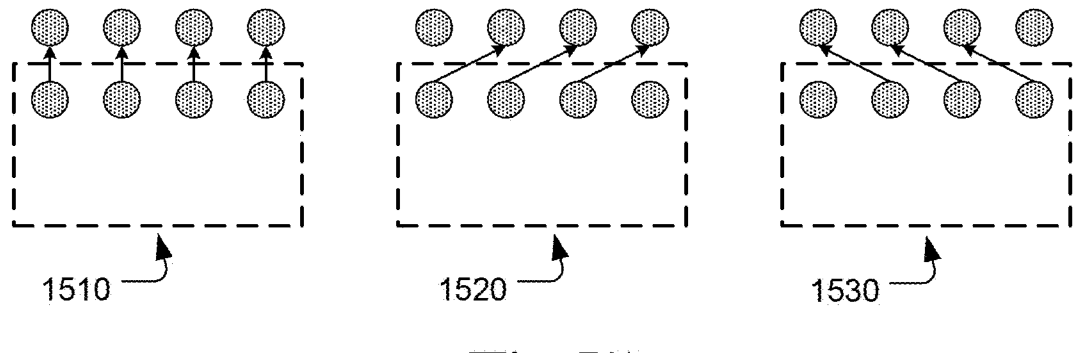
FIG. 15 shows examples of directional boundary matching including angular directions other than the horizontal and vertical directions according to one embodiment of the present invention.

Compared to the conventional boundary matching algorithm, which only includes vertical (for top) or horizontal (for left) direction matching (e.g. residual sign prediction inside ECM), in the proposed method, the boundary matching criteria not only include vertical (for top edge) and/or horizontal (for left edge), but also some other angles. As shown in FIG. 15, the traditional boundary matching 1510 compares the pixels vertically; the proposed boundary matching method can compare pixels in a diagonal direction (an angle toward upper-right direction 1520 or upper-left direction 1530). For other angles, it can use filter (e.g. FIR filter) to interpolate the fractional position of pixels (for example, if the corresponding positions pointed by the angle is not an integer position of pixel)

The angle of the matching process can be explicitly signalled or implicitly derived (in decoding process).

In one embodiment, the smoothness matching angle can be explicitly signalled in CU/PU/CTU basis, it can also be predicted by neighbouring CUs (for example, the smoothness matching angle of the left or top neighbouring CU and the detail angle difference is signalled.)

In another embodiment, the smoothness matching angle can be implicitly decided. In one embodiment, the angle is decided by intra-mode mode (for example, in VVC, the intra coding mode has various angles, the intra-mode specified angle can be reused as the boundary smoothness matching angle). In another embodiment, the angle can be decided by context analysis for the current L-shape (current L shape is the L-shape pixel region surrounding the current CU), such as the angle analysis (using angle filter) or angle histogram by some angle filters.

In another embodiment, the angle can be partially signalled and partially implicitly decided. In one example, encoder can send one coarse angle and decoder-deriving one fine-angle. The coarse angle and the derived fine-angle can be combined together to form the final angle. In another example, encoder can send one fine angle and decoder-deriving one coarse-angle.

After the angle is decided, the boundary matching can be smoothness matched (compare pixels along the direction) or gradient-value matching (compare gradient value along the direction) according to the angle.

Value Clipping During Calculating Differences

In some cases, the L-shape (of neighbouring pixels surrounding the current CU) may be another object (different with the object of current CU). In this case, the boundary smoothness matching may cause loss. To solve this risk, one new method is proposed. In this method, when calculating boundary smoothness matching, it will apply clipping for the sample matching difference.

In one embodiment, the clipping threshold can be fixed. In another embodiment, the clipping threshold can be signalled in CTU-level or picture-level or sequence-level. In yet another embodiment, the clipping threshold can be implicitly decided by context-analysis or histogram analysis for the current L shape and current predictor. In yet another embodiment, the clipping threshold can be implicitly decided according to original video bit-depth or the internal bit-depth in codec.

Boundary Selection Based on Similarity of Motion-Vectors

The boundary selection can be performed implicitly. Following are some examples of implicit boundary selection.

In some cases, the neighbouring pixels may have discontinuity with current CU (for example, the neighbour CU is located in another object). In this case, the boundary matching method may cause loss. Therefore, one method to decide whether to trust the neighbouring pixels is needed.

In this proposed method, in one embodiment, if the MV of the neighbouring MV of the side (top or left side) has large difference from the current CU MV, this side will not be included for boundary matching. The MV for similarity (or difference) comparison can be pixel-wise (assume neighbouring region and current CU region have pixel-wise MV), subblock-wise (assume neighbouring region and current CU region have subblock-wise MV) or CU (block)-wise.

Figure 16:
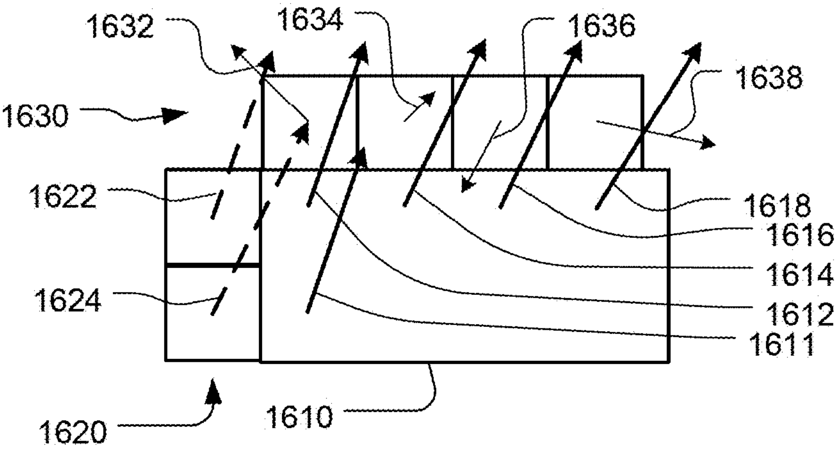
FIG. 16 shows an example of selectively excluding the top or left region for boundary matching calculation based on similarity/difference of motion vectors between the current block and one or more neighbouring blocks according to one embodiment of the present invention.

One example according to this method is shown in FIG. 16, where block 1610 corresponds the current CU, boxes 1620 correspond to left neighbouring subblocks and boxes 1630 correspond to top neighbouring subblocks. The motion vectors of the left neighbouring subblocks are labelled as 1622 and 1624. The motion vectors of the top neighbouring subblocks are labelled as 1632, 1634, 1636 and 1638. The motion vectors of the current block on the left side are labelled as 1611 and 1612. The motion vectors of the current block near the top side are labelled as 1612, 1614, 1616 and 1618. As shown in FIG. 16, the motion vectors of the current block are similar to the motion vectors of the left neighbouring subblocks and the motion vectors of the current block are very different from the motion vectors of the top neighbouring subblocks. Accordingly, only the left boundary pixels are included in the boundary matching calculation.

Figure 17:
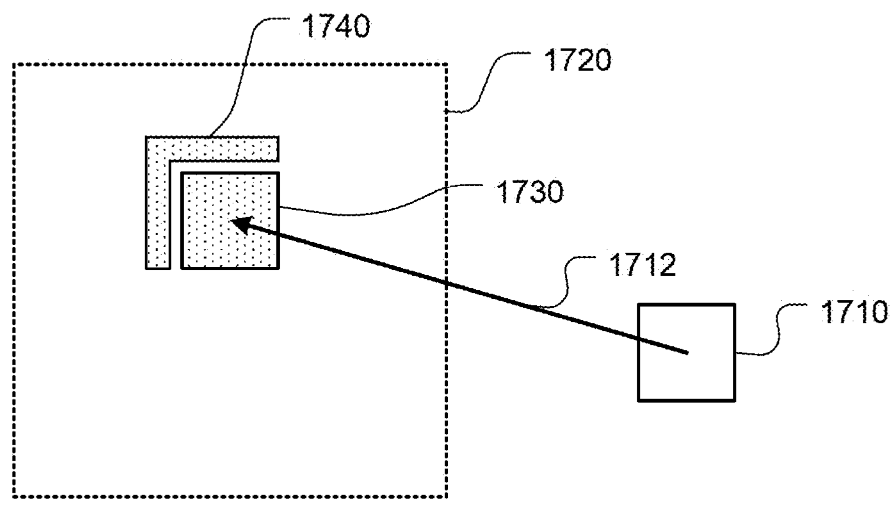
FIG. 17 shows another example of selectively excluding the top or left region for boundary matching calculation by context analysis of a reference block and its L-shape neighbouring region according to one embodiment of the present invention.

In another embodiment, decoder can refer to the corresponding reference pixels (the pixels 1730 in the reference picture 1720 pointed by the current MV 1715 of the current CU 1710) and the corresponding L-shape region 1740 in the reference picture, as shown in FIG. 17. If the corresponding L-shape pixels 1740 of the top or left side are very different from the reference block 1730, then it can implicitly give up (i.e., not using) the corresponding side for the current CU. For example, if the corresponding L-shape pixels of the top side are very different from the reference block, then the current block will not use the top pixels of the current L-shape for matching.

Considering Cb and Cr Block Boundaries at the Same Time, When JCCR is Enabled

In ECM 2.0, there is one coding tool of sign prediction method (by boundary matching), in JCCR case, the boundary matching is only applied for one fixed color component (for example, fixed to compare the boundary matching for Cb)

In this method, when doing sign prediction for residual by boundary matching for JCCR case, it is proposed to consider Cb and Cr block boundaries at the same time.

In one embodiment, both Cb pixels and Cr pixels are boundary matched, and the total distortion is used to decide the residual sign bits.

In another embodiment, the Cb boundary matching result and Cr boundary matching result are weighted for deciding the residual sign bits.

In another embodiment, encoder can send a signal to inform the decoder to select Cb-boundary-matching or Cr-boundary-matching.

In another embodiment, the weighting (weighted summation for the matching cost) for the Cb-boundary-matching and the Cr-boundary-matching depends on the JCCR mode. For one example, if in the certain JCCR mode, the Cb is more important than Cr, then the Cb-boundary-matching will be more important in the weighted summation.

In another sub-embodiment, it depends on the difference between current predictor and neighbouring reconstructed pixel. For example, if the difference between current predictor and neighbouring reconstructed pixel for Cb is much larger than that for Cr, then it has higher weighting for Cb boundary matching (or, in another example, skipping Cr boundary matching).

Check or Subsampling Based on Horizontal Boundary Only

In this method, to reduce complexity for the boundary matching, the boundary matching can be based on the horizontal boundary only. In the case that the multiple transform kernel with N different transform kernels can be implicitly selected by the boundary matching, the decoder will generate N different versions of inverse transform and add back onto predictor to make N different versions of reconstruction. Then, the decoder will use the kernel to achieve the smallest boundary matching cost. Accordingly, coding gain can be achieved without the need for extra signalling related to the multiple kernel selection. At the decoder, conventionally the vertical inverse transform is firstly performed and then the horizontal inverse transform. According to the present invention, only the horizontal boundary check is performed for the boundary matching. In theory, we only need to generate the leftmost column of samples for inverse horizontal transform. Therefore, the complexity for boundary matching computation is substantially reduced.

Another method to save the complexity for the multiple kernel selection is to subsample the matching sample. Therefore, there is no need to generate all inverse transform samples according to this embodiment.

Enhancement of L-Shape

In this method, to improve the current L-shape pixels in order to improve the coding gain of boundary-matching method, some embodiments are proposed as follows.

According to one embodiment, it is proposed to do noise reduction for the boundary pixels for better boundary matching quality. The boundary matching process will be applied after the noise reduction processing.

In another embodiment, it is proposed to do some MH (multi-hypothesis) blending (e.g. using L-shapes of two other MH blocks to slightly adjust the current L-shape), For example, it will use one or more MVs and fetch the corresponding L-shape pixels from the reference picture (pointed by MV) to do some blending, the resulting L-shape pixels will be better for boundary matching.

Selective Boundary Region for Matching

The main purpose of this proposed method is to avoid incorrect boundary pixels for matching and, moreover, this method is region based (not using entire top edge or left edge, but only partial region(s) of the top or left neighbour pixels).

In one embodiment, if the neighbour MVs (e.g. subblock units) are largely different from the current MVs for some regions, then it will give up this region of boundary pixels for matching.

In another embodiment, it can use segmentation based method to do the analysis for the L-shape region. In other words, the neighbouring L shape will be segmented and judged based on the object shape of the L-shape according to this embodiment. Then, it can avoid the boundary matching from a different object by excluding the corresponding region(s) for boundary matching Adaptive Number of Lines for Computing Smoothness In this proposed method, the number of lines for boundary smoothness calculation is adaptively changed. In one example, it may use more or less lines of neighbouring boundary to compute the boundary smoothness depending on some size conditions, content conditions and so on. The boundary smoothness calculation may correspond to the pixel smoothness, gradient smoothness, or angle smoothness.

In one embodiment, for larger CUs, it will use more lines for the boundary matching.

In another embodiment, for smaller CUs, it will use less lines for the boundary matching.

In yet another embodiment, for narrow CUs, it will use more lines for shorter edge for the boundary matching. For low-texture CUs, it will use more lines.

In yet another embodiment, for high-texture CUs surrounding pixels where the top and/or left neighbouring pixels have a high degree of texture, it will use less lines for the boundary matching BCW Weighting Selection With Predictor-Only Implicit Selection or Syntax Reorder The boundary matching can also be applied for BCW weighting selection to save BCW weighting syntax bitrate. For example, we can generate the predictor with different assumptions of BCW weighting at the decoder side, the different weighting assumption results are added to the residual to make different assumption versions of reconstruction blocks. The boundary matching is then applied for those different versions of reconstruction blocks, so as to select the best one for the BCW weighting decision in the decoder side.

Beside the previous method, other embodiments for the BCW weighting syntax saving based on boundary matching are disclosed as follows.

In one embodiment, the BCW weighting values are sorted according to the matching cost for different versions of reconstruction blocks. The reordered index sent by the encoder is then used to select the final BCW weighting value from the sorted list of weighting values.

In another embodiment, we do not add different versions of predictors to the residual. Instead, different versions of predictors corresponding to the different assumptions of weighting values are directly compared with the reconstruction neighbouring pixels of the neighbouring L shape to determine the smallest one for the decoder-derived weighting.

OBMC (Overlapped Block Motion Compensation)

In ECM, when OBMC is applied, the top and left boundary samples of a CU are refined using neighbouring block's motion information with a weighted prediction as described in JVET-L0101 (Zhi-Yi Lin, et. al., "CE10.2.1: OBMC", Joint Video Experts Team (JVET) of ITU-T SG 16 WP 3 and ISO/IEC JTC 1/SC 29, 12th Meeting: Macao, CN, 3-12 Oct. 2018, Document: JVET-L0101), JVET-U0100 (Yao-Jen Chang, et. al., "Compression efficiency methods beyond VVC", Joint Video Experts Team (JVET) of ITU-T SG 16 WP 3 and ISO/IEC JTC 1/SC 29, 21st Meeting, by teleconference, 6-15 Jan. 2021, Document: JVET-U0100), JVET-K0258 (Chun-Chia Chen, et. al., "CE10-related: OBMC complexity reduction and parallel blending", Joint Video Experts Team (JVET) of ITU-T SG 16 WP 3 and ISO/IEC JTC 1/SC 29, 11th Meeting: Ljubljana, SI, 10-18 Jul. 2018, Document: JVET-K0258). The OBMC sample blending operation is processed for each top/left block at the top/left CU boundaries (top-direction OBMC of top 4×4 row, and left-direction OBMC of left 4×4 column). The original MC result using current CU MV (denoted as Pixel1) and the additional MC result using neighbouring CU MV (denoted as Pixel2) are blended to obtain the new prediction result (denoted as NewPixel).

For luma blocks, the number of blending pixel rows/columns is 4 and the corresponding weighting factors are:

$$NewPixel(i, j) = (26 \times Pixel1(i, j) + 6 \times Pixel2(i, j) + 16) >> 5$$

$$NewPixel(i, j) = (7 \times Pixel1(i, j) + Pixel2(i, j) + 4) >> 3$$

$$NewPixel(i, j) = (15 \times Pixel1(i, j) + Pixel2(i, j) + 8) >> 4$$

$$NewPixel(i, j) = (31 \times Pixel1(i, j) + Pixel2(i, j) + 16) >> 5$$

For chroma blocks, the number of blending pixel rows/columns is 1 and the weighting factors are:

$$NewPixel(i, j) = (26 \times Pixel1(i, j) + 6 \times Pixel2(i, j) + 16) >> 5$$

Template Matching Based OBMC

Figures 18, 19:
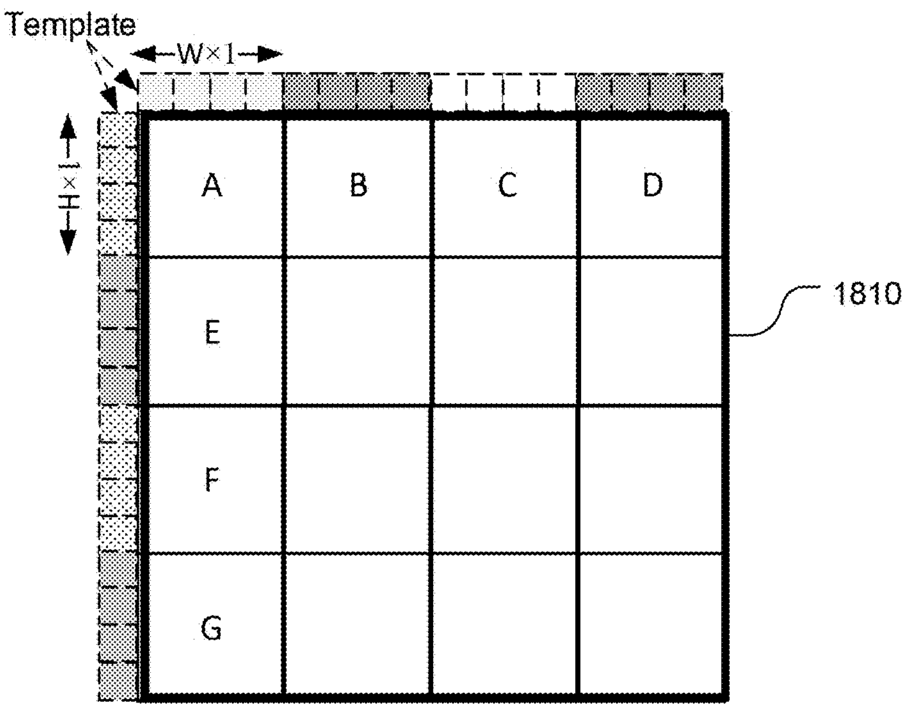
FIG. 18 illustrates an example of Template Matching based OBMC where, for each top block with a size of 4×4 at the top CU boundary, the above template size equals to 4×1.
FIG. 19 illustrates an example of the current blocks and its neighbouring blocks for Template Matching based OBMC.

Recently, a template matching-based OBMC scheme has been proposed (JVET-Y0076) to the emerging international coding standard. As shown in FIG. 18, for each top block with a size of 4×4 at the top CU boundary, the above template size equals to 4×1. In FIG. 18, box 1810 corresponds to a CU. If N adjacent blocks have the same motion information, then the above template size is enlarged to 4N×1 since the MC operation can be processed at one time, which is in the same manner in ECM-OBMC. For each left block with a size of 4×4 at the left CU boundary, the left template size equals to 1×4 or 1×4N. FIG. 19 illustrates an example of the current blocks and its neighbouring blocks. In FIG. 19, box 1910 corresponds to a CU.

For each 4×4 top block (or N 4×4 blocks group), the prediction value of boundary samples is derived according to the following steps:

Take block A as the current block and its above neighbouring block AboveNeighbour_A for example. The operation for left blocks is conducted in the same manner.

First, three template matching costs (Cost1, Cost2, Cost3) are measured by SAD between the reconstructed samples of a template and its corresponding reference samples derived by MC process according to the following three types of motion information:

i. Cost1 is calculated according to A's motion information.

ii. Cost2 is calculated according to AboveNeighbour_A's motion information.

iii. Cost3 is calculated according to weighted prediction of A's and AboveNeighbour_A's motion information with weighting factors as ¾ and ¼ respectively.

Second, choose one out of three approaches to calculate the final prediction results of boundary samples by comparing Cost1, Cost2 and Cost3.

The original MC result using current block's motion information is denoted as Pixel1, and the MC result using neighbouring block's motion information is denoted as Pixel2. The final prediction result is denoted as NewPixel.

If Cost1 is minimum, then NewPixel (i, j)=Pixel1(i,j).

If Cost2 is minimum, then blending mode 1 is used.

For luma blocks, the number of blending pixel rows is 4.

$$NewPixel(i, 0) = (26 \times Pixel1(i, 0) + 6 \times Pixel2(i, 0) + 16) >> 5$$

$$NewPixel(i, 1) = (7 \times Pixel1(i, 1) + Pixel2(i, 1) + 4) >> 3$$

$$NewPixel(i, 2) = (15 \times Pixel1(i, 2) + Pixel2(i, 2) + 8) >> 4$$

$$NewPixel(i, 3) = (31 \times Pixel1(i, 3) + Pixel2(i, 3) + 16) >> 5$$

For chroma blocks, the number of blending pixel rows is 1.

$$NewPixel(i, 0) = (26 \times Pixel1(i, 0) + 6 \times Pixel2(i, 0) + 16) >> 5$$

If Cost3 is minimum, then then blending mode 2 is used.

For luma blocks, the number of blending pixel rows is 2.

$$NewPixel(i, 0) = (15 \times Pixel1(i, 0) + Pixel2(i, 0) + 8) >> 4$$

$$NewPixel(i, 1) = (31 \times Pixel1(i, 1) + Pixel2(i, 1) + 16) >> 5$$

For chroma blocks, the number of blending pixel rows/columns is 1.

$$NewPixel(i, 0) = (15 \times Pixel1(i, 0) + Pixel2(i, 0) + 8) >> 4$$

Boundary-Matching Based Method for OBMC

Figure 14:
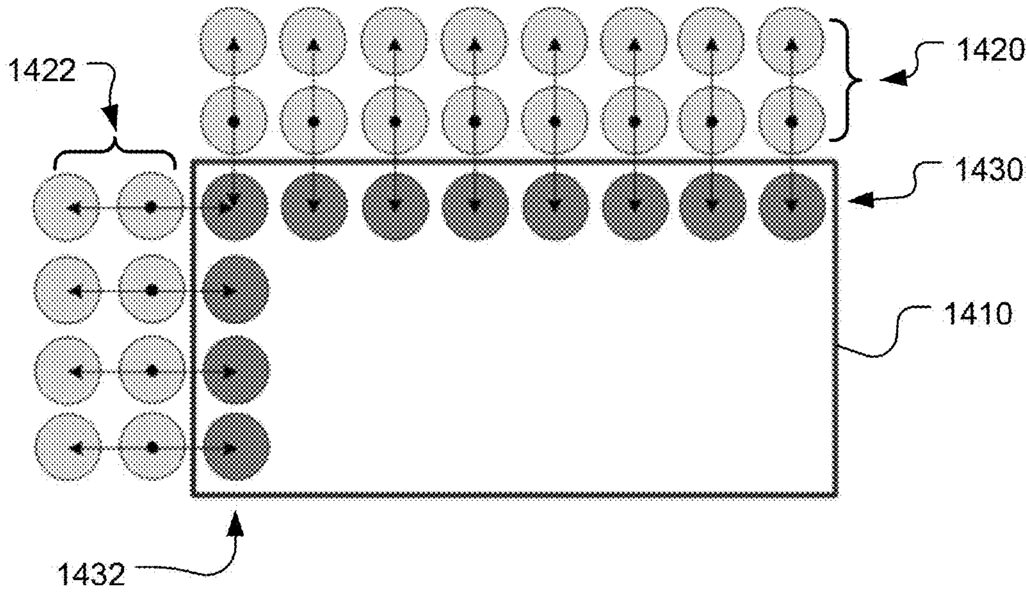
FIG. 14 shows an example of boundary pixels involved in the boundary matching cost calculation.

In the current invention, we propose to use boundary-matching (i.e., matching the hypothesis predictor with L-neighbour boundary pixels or reconstructed pixels with L-neighbour boundary pixels). The L-neighbour boundary pixels refer to the neighbouring pixels above the CU top boundary and/or the neighbouring pixels to the left of the CU left boundary. The L-neighbour boundary pixels may correspond to one row above the CU top boundary and/or one column to the left of the CU left boundary. Nevertheless, more rows or columns may be used according to the present invention. The boundary matching (for example, as the boundary matching adopted in ECM2.0) is a discontinuity measure across block boundaries as shown on FIG. 14 and eqn. (10). However, the present invention is not limited to the particular number of rows or columns at the boundary. Also, the present invention is not limited by the specific formula or specific parameters (e.g. eqn. (10)).

For the top-most subblocks (e.g., subblocks A, B, C and D in FIG. 19) or left-most subblocks (e.g., subblocks A, E, F and G in FIG. 19), it generates different hypothesis versions of predictor, by using the neighbouring MV to perform motion compensation (MC), using the original MV to perform MC, or using some weighted average of the hypothesis version according to the neighbouring MV and the hypothesis version according to the current MV (of the current subblock). The different versions of hypothesis predictor can be compared to the L-neighbour reconstructed pixels to get the boundary matching cost. The best hypothesis predictor can be used as the final decision mode. In another embodiment, instead of hypothesis predictor, we may use the reconstructed samples (i.e., predictor+residual) for calculating the boundary matching cost.

Figure 1A:
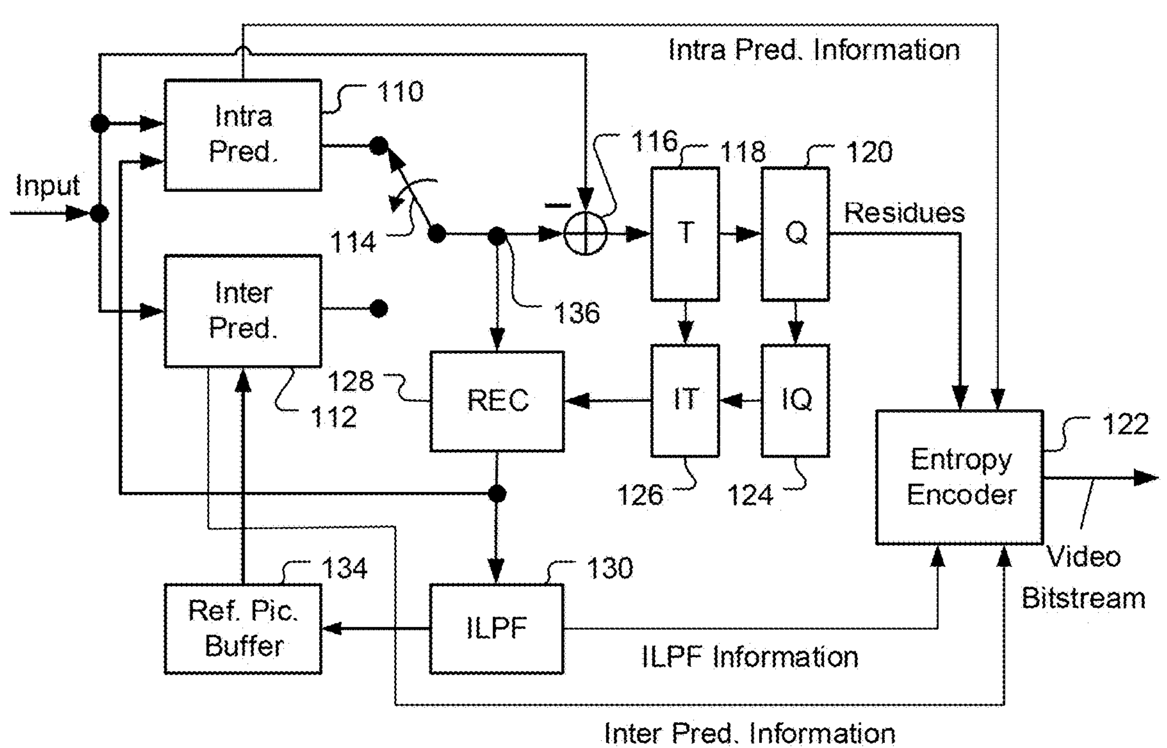
FIG. 1A illustrates an exemplary adaptive Inter/Intra video coding system incorporating loop processing.
Figure 1B:
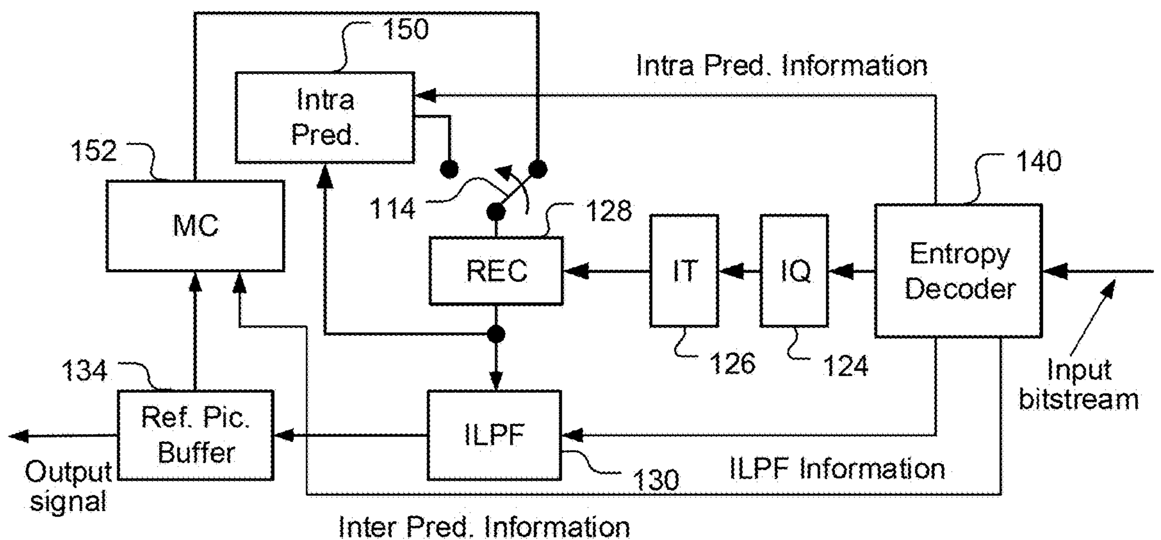
FIG. 1B illustrates a corresponding decoder for the encoder in FIG. 1A.
Figure 2:
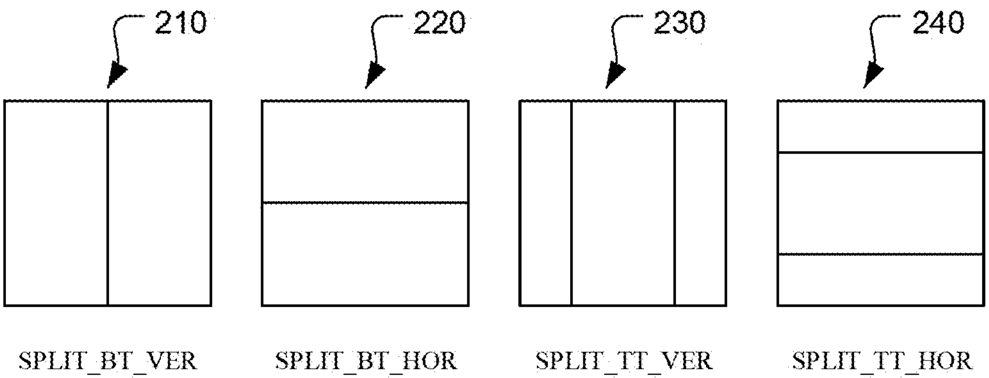
FIG. 2 illustrates examples of a multi-type tree structure corresponding to vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR).
Figure 3:
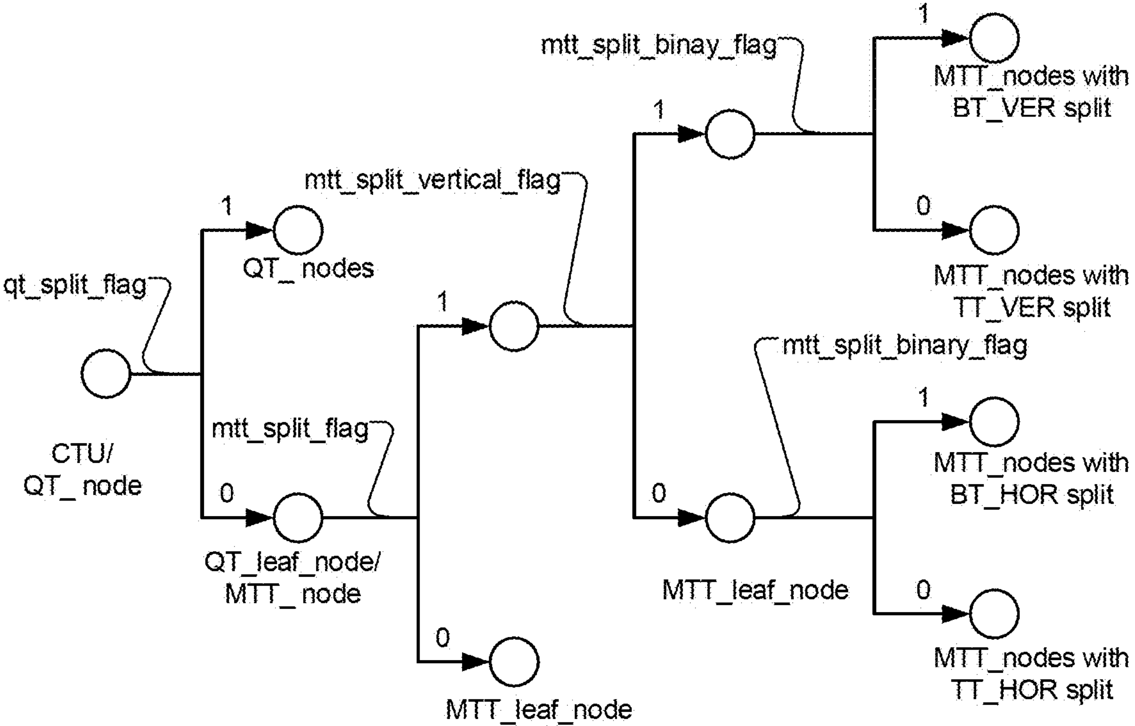
FIG. 3 illustrates an example of the signalling mechanism of the partition splitting information in quadtree with nested multi-type tree coding tree structure.
Figure 4:
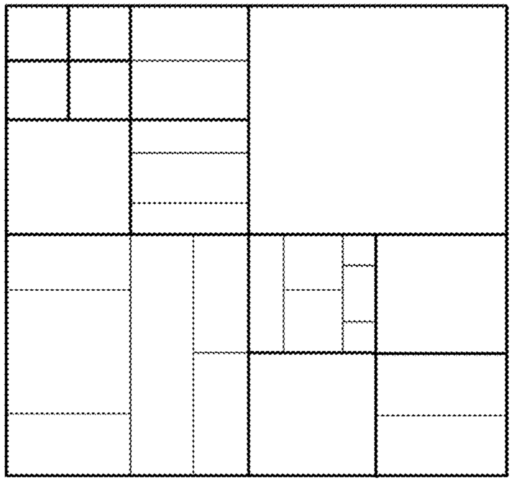
FIG. 4 shows an example of a CTU divided into multiple CUs with a quadtree and nested multi-type tree coding block structure, where the bold block edges represent quadtree partitioning and the remaining edges represent multi-type tree partitioning.
Figure 5:
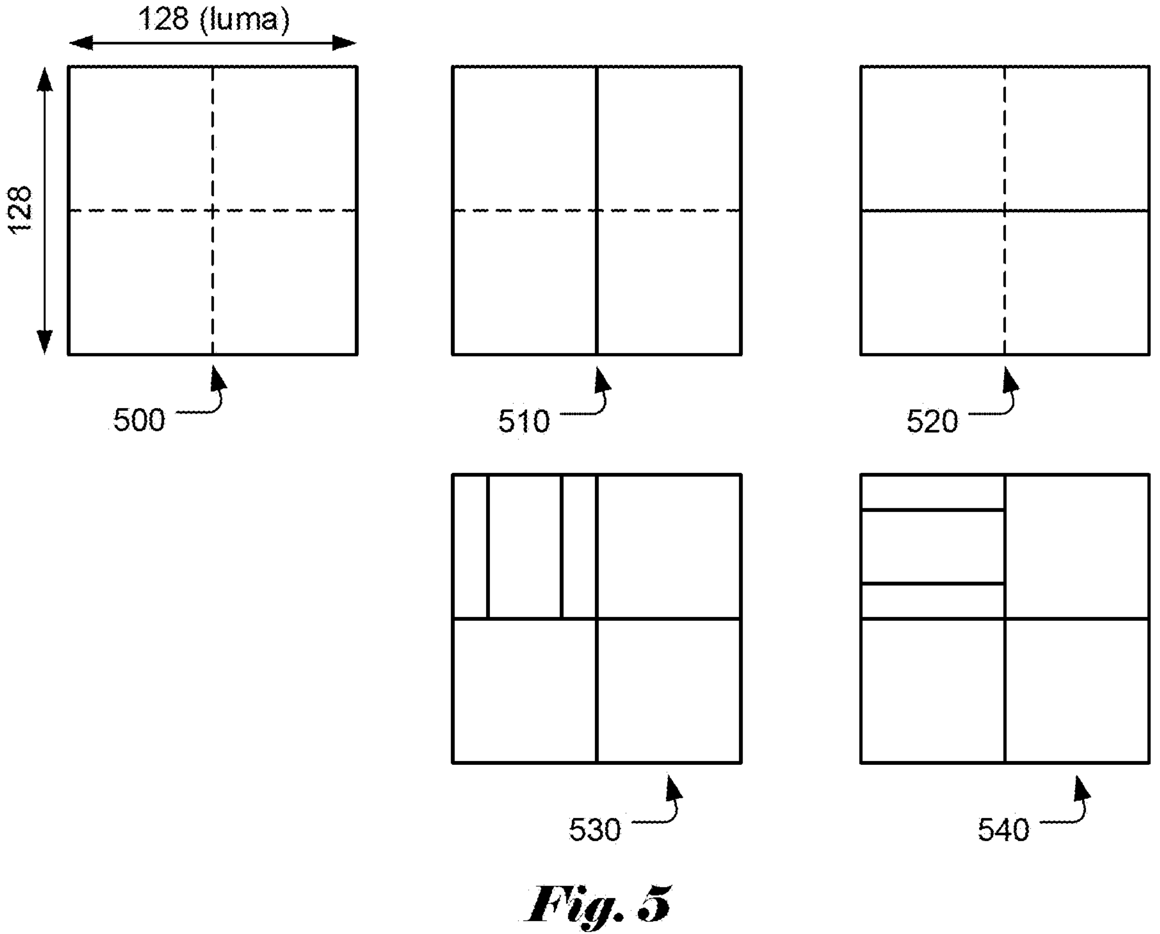
FIG. 5 shows an example of TT split forbidden when either width or height of a luma coding block is larger than 64.
Figures 6, 7:
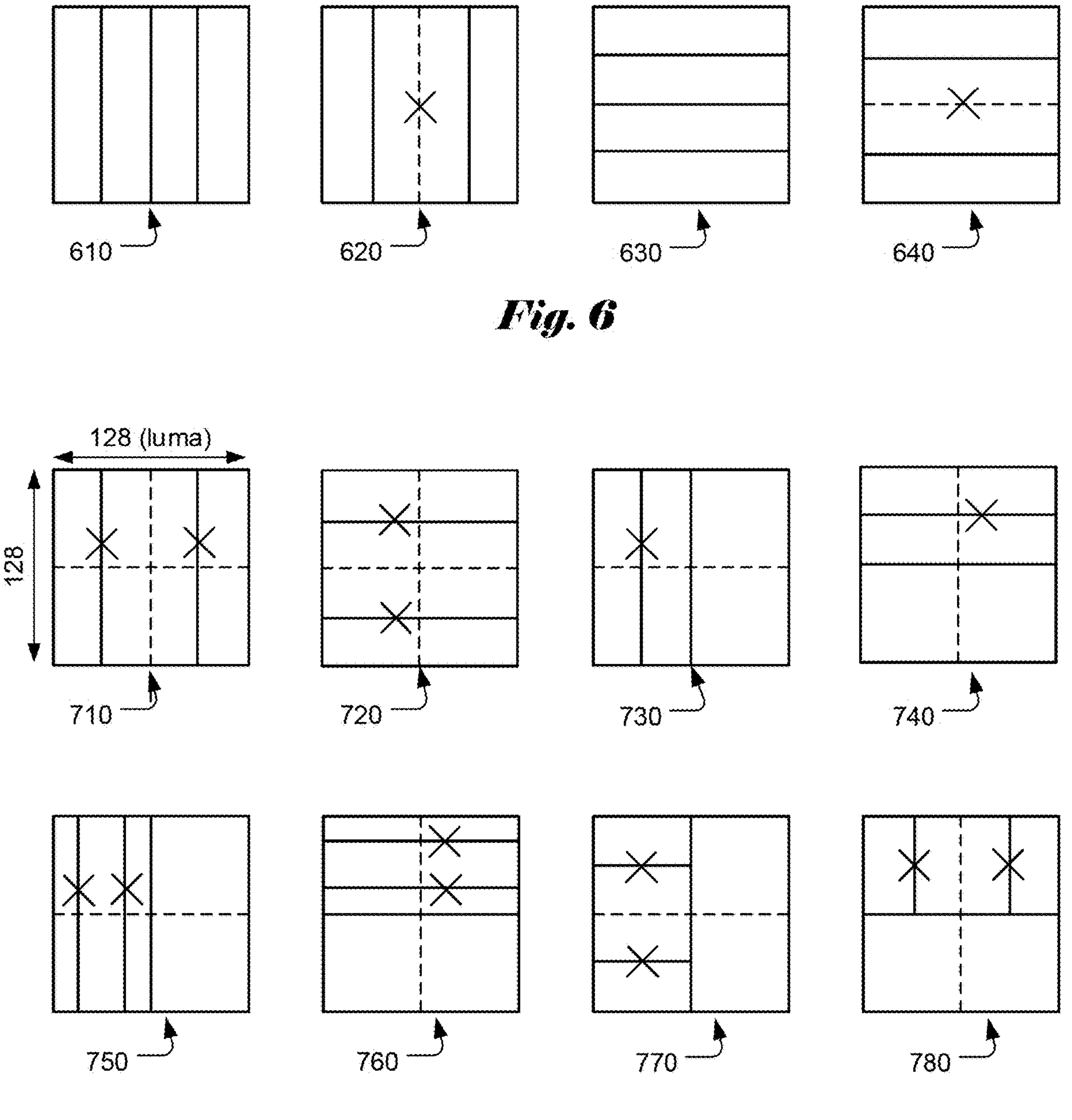
FIG. 6 illustrates an example of the redundant splitting patterns of binary tree splits and ternary tree splits.
FIG. 7 shows some examples of TT split forbidden when either width or height of a luma coding block is larger than 64.
Figure 8:
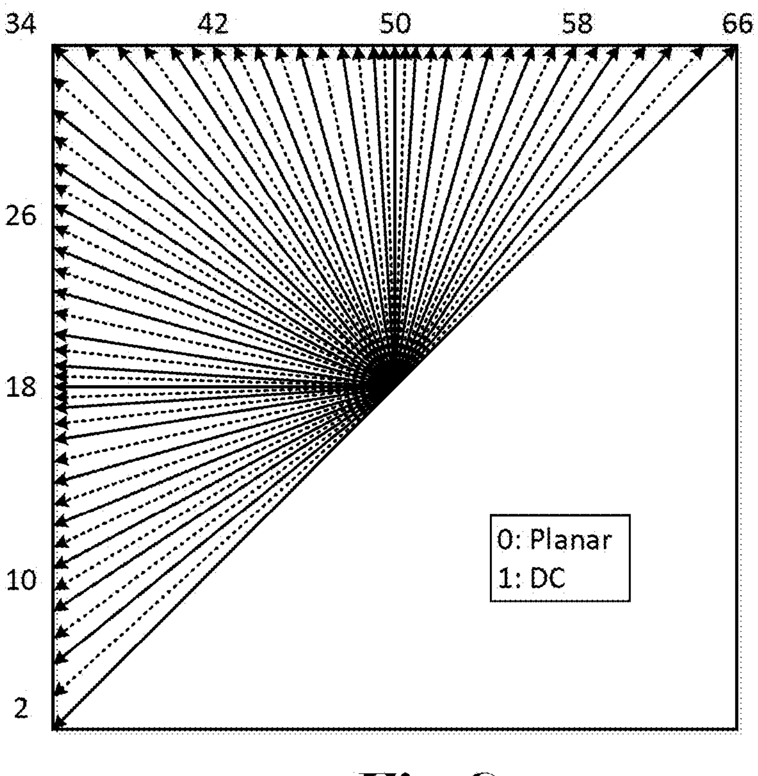
FIG. 8 shows the intra prediction modes as adopted by the VVC video coding standard.
Figure 9A:
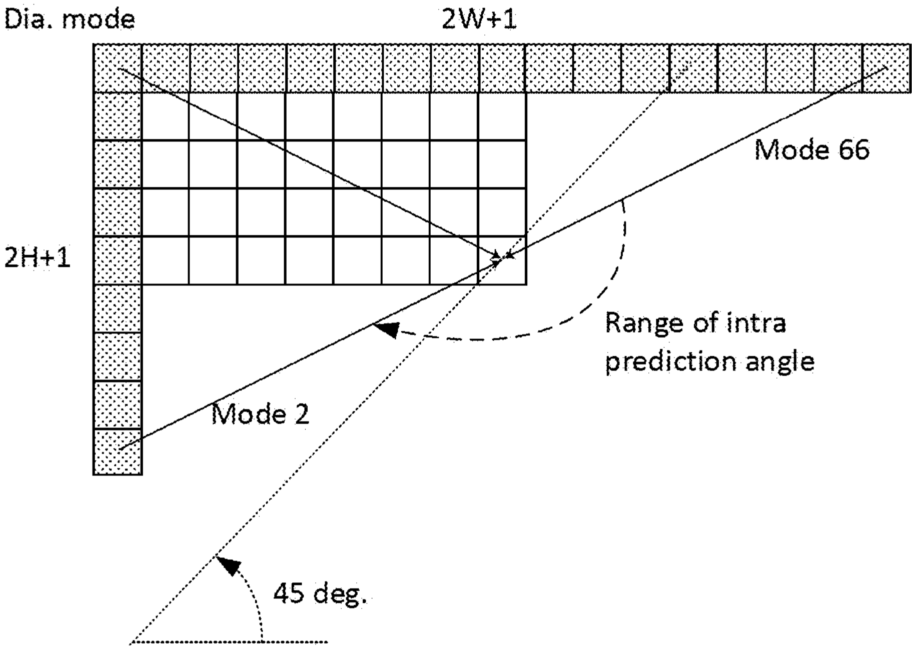
FIGS. 9A-B illustrate examples of wide-angle intra prediction a block with width larger than height (FIG. 9A) and a block with height larger than width (FIG. 9B).
Figure 9B:
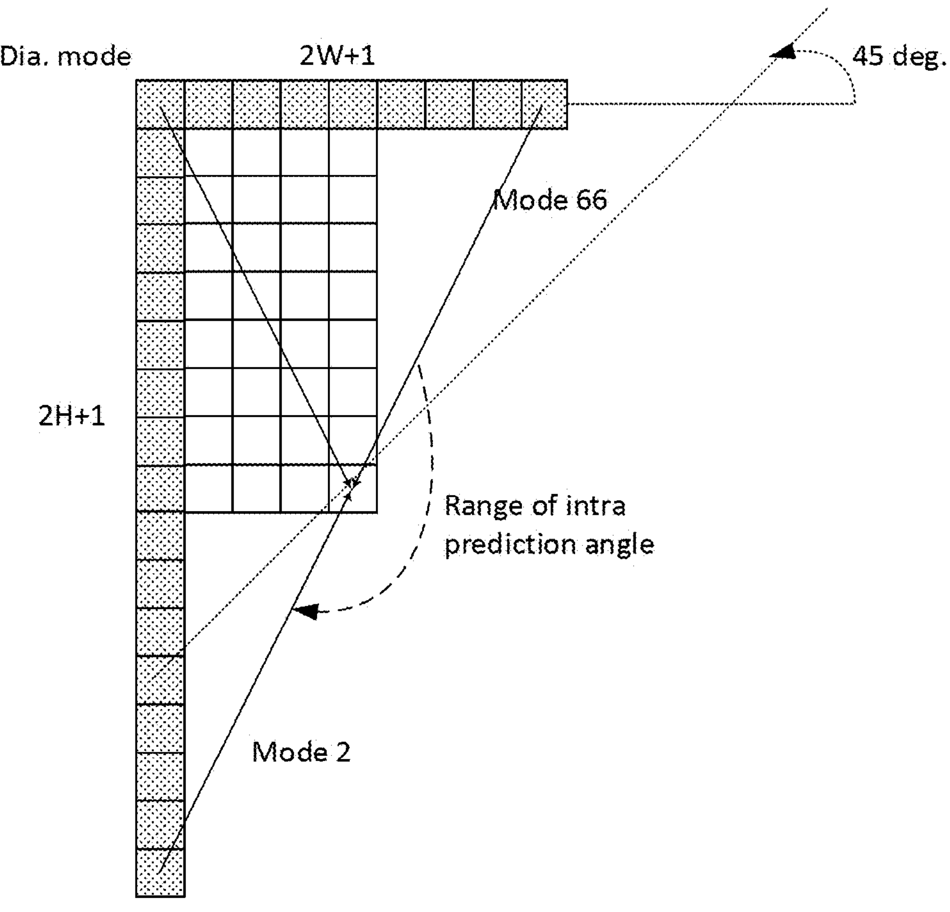
Figure 10:
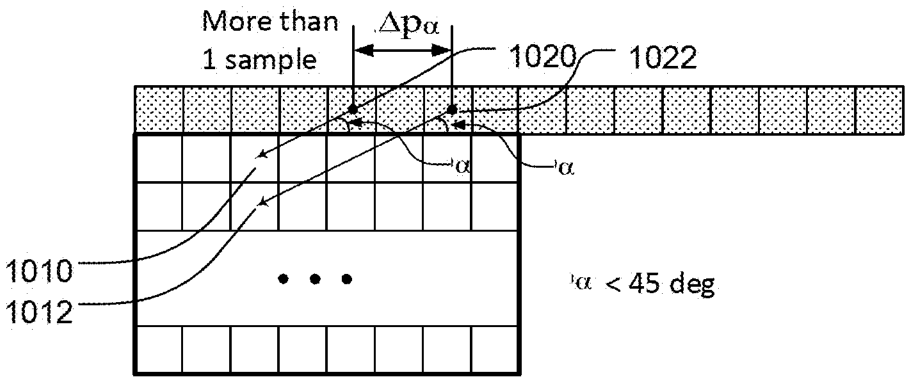
FIG. 10 illustrate examples of two vertically-adjacent predicted samples using two non-adjacent reference samples in the case of wide-angle intra prediction.
Figure 11:
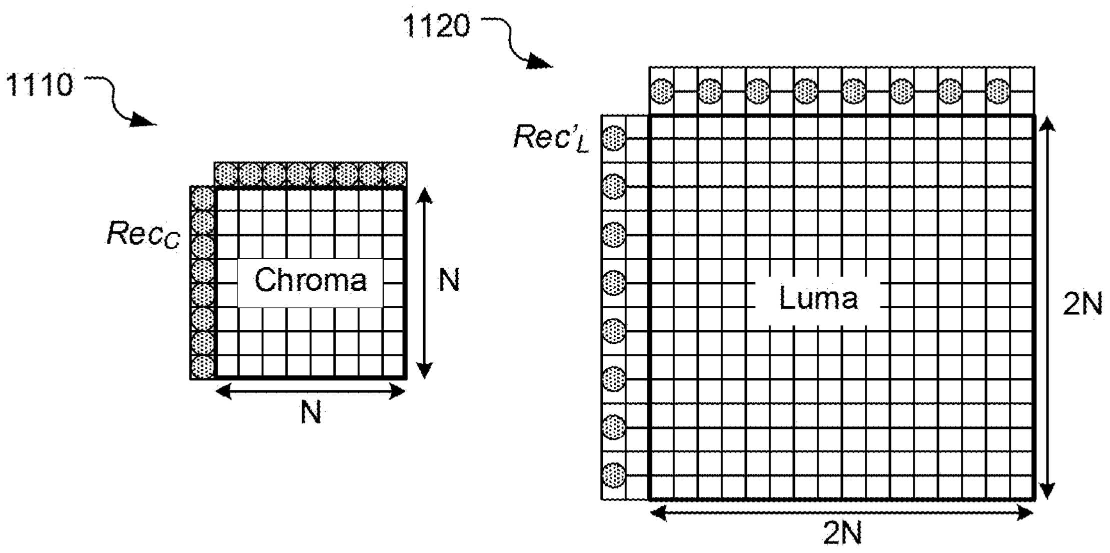
FIG. 11 shows an example of the location of the left and above samples and the sample of the current block involved in the CCLM mode.
Figure 12A:
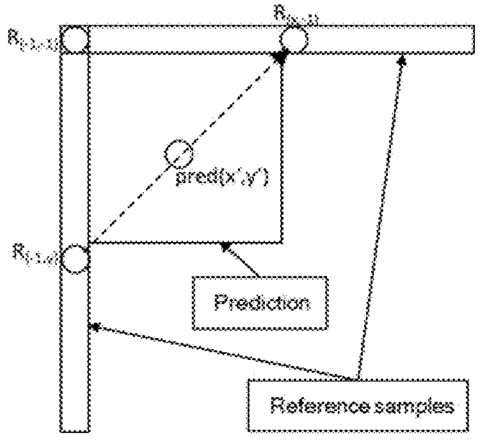
FIGS. 12A-D illustrate examples of the definition of reference samples for PDPC applied over various prediction modes, where FIG. 12A corresponds to the diagonal top-right mode, FIG. 12B corresponds to the diagonal bottom-left mode, FIG. 12C corresponds to the adjacent diagonal top-right mode and FIG. 12D corresponds to the adjacent diagonal bottom-left mode.
Figure 12B:
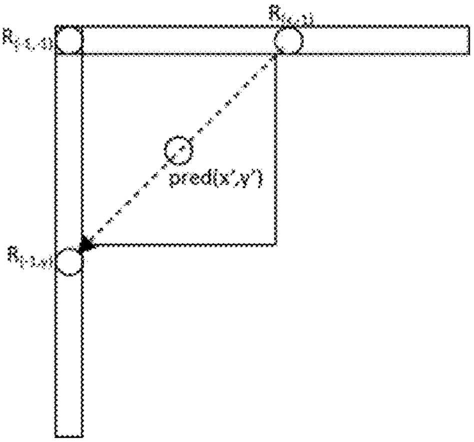
Figure 12C:
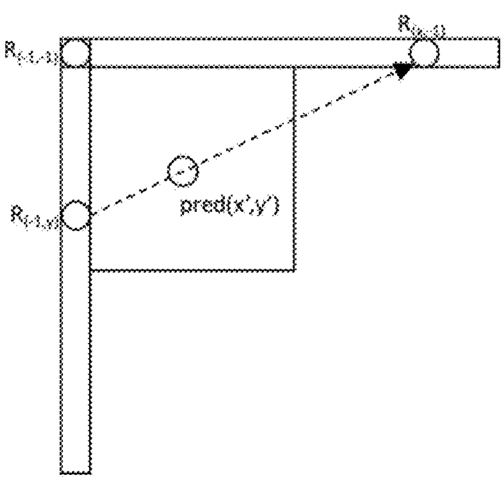
Figure 12D:
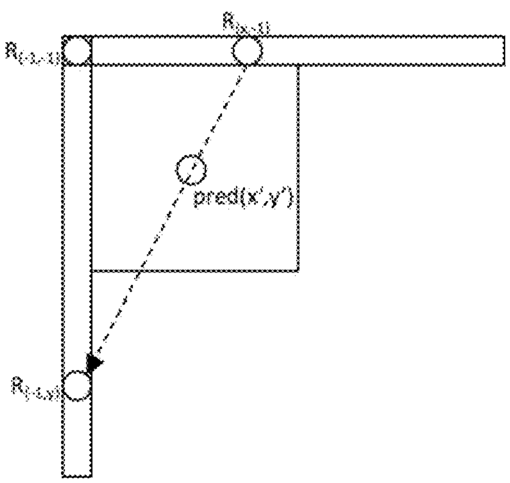
Figure 13:
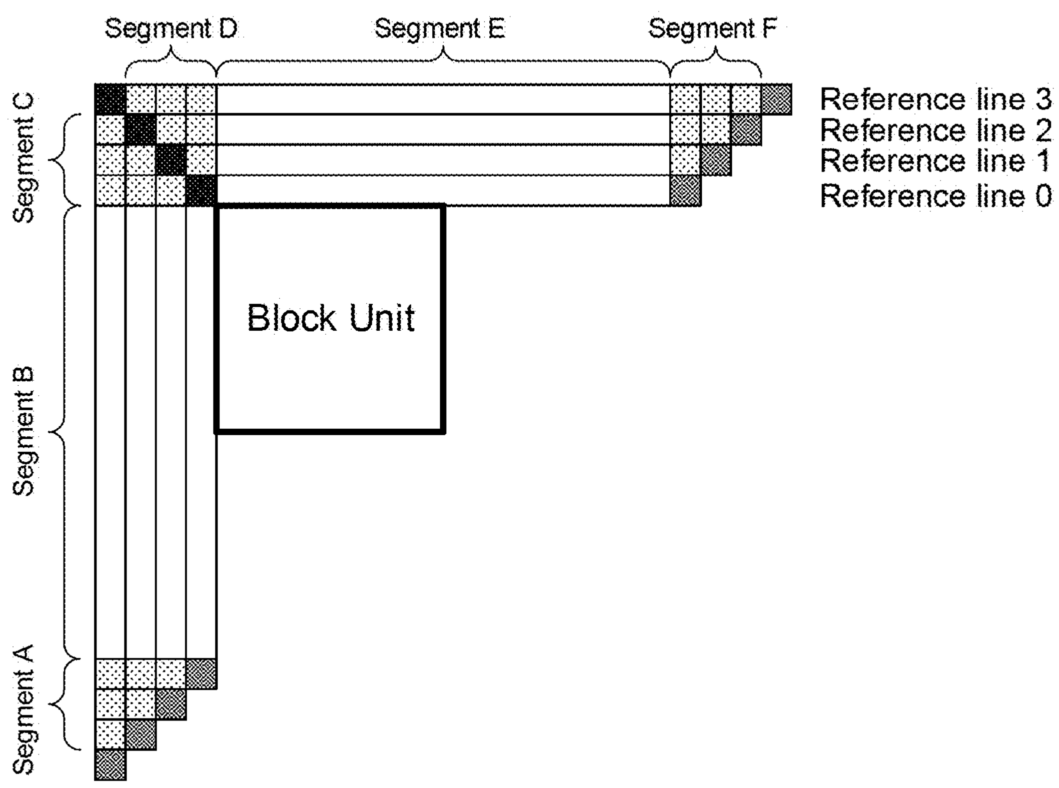
FIG. 13 shows an example of multiple reference line (MRL) intra prediction uses more reference lines for intra prediction.

The boundary-matching based method for OBMC as described above can be implemented in an encoder side or the decoder side. For example, in the encoder side, the required processing can be implemented as part of the Inter-Pred. unit 112 as shown in FIG. 1A. However, the encoder may also use additional processing unit to implement the required processing. For the decoder side, the required processing can be implemented as part of the MC unit 152 as shown in FIG. 1B. However, the decoder may also use additional processing unit to implement the required processing. While the Inter-Pred. 112 and MC 152 are shown as individual processing units, they may correspond to executable software or firmware codes stored on a media, such as hard disk or flash memory, for a CPU (Central Processing Unit) or programmable devices (e.g. DSP (Digital Signal Processor) or FPGA (Field Programmable Gate Array)).

For example, we can have 3 modes, one is off-mode (i.e., no OBMC), one is neighbour-strong mode (i.e., strong dependency on the neighbouring block for OBMC), and one is neighbour-weak mode (i.e., weak dependency on the neighbouring block for OBMC). For each mode, one hypothesis MV is generated. For example, we can use the current MV for the off-mode; use the neighbour MV solely for the neighbour-strong mode; use a weighted summation of the neighbour MV and the current MV. For each mode, there will be a corresponding OBMC blending mode. For example, for the neighbour-strong mode, we can blend all 4 lines for the conventional OBMC process. According to the conventional OBMC process, for the leftmost or topmost subblocks inside the current CU, it generates 2 MC results: one from current MV and another from the neighbour MV. The 2 MC results are then blended together. For the neighbour-weak mode, because the neighbour MV is not so trustworthy, we only blend for 2 lines.

In generally, we use boundary smoothness matching for the subblock mode selection for OBMC. After the boundary matching result, we can select a mode, and the selected mode will have corresponding process to generate the final predictor.

In one embodiment, the hypothesis predictor (i.e., hypothesis predictor for a different candidate for boundary matching) is used as the final predictor.

In another embodiment, the decided mode will have different OBMC process parameter (e.g. blending lines, blending weightings, etc.)

The present invention also discloses various ways to generate different hypothesis predictors. In one embodiment, it uses the current MV and neighbour MV to generate the different hypothesis. In another embodiment, it assumes multiple search locations around the current MV and/or the neighbour MV to generate the hypothesis. In yet another embodiment, it uses different granularity degrees of the neighbouring MV (such as the CU level, subblock level, pixel-level) to generate the hypothesis predictor for the current subblock. In yet another embodiment, it averages (or weighted average) for MVs of multiple neighbouring sub-blocks for generating the hypothesis for the current sub-block.

The boundary matching process mentioned above can be based on the predictor for the current block and reconstructed neighbouring samples. In another embodiment, the boundary matching process can be based on "predictor+residual" for the current block and reconstructed neighbouring samples.

Any of the foregoing proposed methods can be implemented in encoders and/or decoders. For example, any of the proposed methods can be implemented in an intra (e.g. Intra 150 in FIG. 1B)/inter coding module of a decoder, a motion compensation module (e.g. MC 152 in FIG. 1B), a merge candidate derivation module of a decoder. Alternatively, any of the proposed methods can be implemented as a circuit coupled to the intra (e.g. Intra 110 in FIG. 1A)/inter coding module of an encoder and/or motion compensation module (e.g. MC 112 in FIG. 1B), a merge candidate derivation module of the encoder.

FIG. 20 illustrates a flowchart of an exemplary video coding system that utilizes boundary matching-based OBMC (Overlapped Block Motion Compensation) according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data associated with a current block are received in step 2010, wherein the input data comprise pixel data for the current block to be encoded at an encoder side or prediction residual data associated with the current block to be decoded at a decoder side. A set of MC (Motion Compensation) candidates with each MC candidate comprising predicted samples for coding boundary pixels of the current block are determined in step 2020, wherein the set of MC candidates comprises a first candidate, and wherein the first candidate corresponds to a weighted sum of first predicted pixels generated according to first motion information of the current block and second predicted pixels generated according to second motion information of a neighbouring boundary block of the current block. Boundary matching costs associated with the set of MC candidates are determined in step 2030, wherein each of the boundary matching costs is determined, for one target candidate of the set of MC candidates, between reconstructed or predicted samples of the current block determined according to said one target candidate and neighbouring reconstructed samples of one or more neighbouring blocks of the current block. A final candidate from the set of MC candidates is determined based on the boundary matching costs in step 2040. The current block is encoded or decoded using the final candidate in step 2050.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:

receiving input data associated with a current block, wherein the input data comprise pixel data for the current block to be encoded at an encoder side or prediction residual data associated with the current block to be decoded at a decoder side;

determining a set of MC (Motion Compensation) candidates with each MC candidate comprising predicted samples for coding boundary pixels of the current block, wherein the set of MC candidates comprises a first candidate, and wherein the first candidate corresponds to a weighted sum of first predicted pixels generated according to first motion information of the current block and second predicted pixels generated according to second motion information of a neighbouring boundary block of the current block;

determining boundary matching costs associated with the set of MC candidates, wherein each of the boundary matching costs is determined, for one target candidate of the set of MC candidates, between reconstructed or predicted samples of the current block determined according to said one target candidate and neighbouring reconstructed samples of one or more neighbouring blocks of the current block;

determining a final candidate from the set of MC candidates based on the boundary matching costs; and encoding or decoding the current block using the final candidate.

2. The method of claim 1, wherein the current block corresponds to a subblock in a top-most boundary of a CU (Coding Unit) enclosing the current block and the neighbouring boundary block of the current block corresponds to an above neighbouring block above the current block.

3. The method of claim 1, wherein the current block corresponds to a subblock in a left-most boundary of a CU (Coding Unit) enclosing the current block, and the neighbouring boundary block of the current block corresponds to a left neighbouring block to the left of the current block.

4. The method of claim 1, wherein the set of MC candidates further comprises a second candidate corresponding to the first predicted pixels.

5. The method of claim 1, wherein the set of MC candidates further comprises a third candidate corresponding to the second predicted pixels.

6. The method of claim 1, wherein the set of MC candidates further comprises a second candidate corresponding to the first predicted pixels and a third candidate corresponding to the second predicted pixels.

7. The method of claim 1, wherein the set of MC candidates comprises multiple first MC candidates corresponding to multiple weightings for the weighted sum.

8. The method of claim 1, wherein the set of MC candidates comprises multiple first MC candidates corresponding to different number of lines for the boundary pixels of the current block.

9. The method of claim 1, wherein the set of MC candidates comprises multiple first MC candidates corresponding to multiple weightings for the weighted sum and different number of lines for the boundary pixels of the current block.

10. An apparatus for video coding, the apparatus comprising one or more electronics or processors arranged to:

receive input data associated with a current block, wherein the input data comprise pixel data for the current block to be encoded at an encoder side or prediction residual data associated with the current block to be decoded at a decoder side;

determine a set of MC (Motion Compensation) candidates with each MC candidate comprising predicted samples for coding boundary pixels of the current block, wherein the set of MC candidates comprises a first candidate, and wherein the first candidate corresponds to a weighted sum of first predicted pixels generated according to first motion information of the current block and second predicted pixels generated according to second motion information of a neighbouring boundary block of the current block;

determine boundary matching costs associated with the set of MC candidates, wherein each of the boundary matching costs is determined, for one target candidate of the set of MC candidates, between reconstructed or predicted samples of the current block determined according to said one target candidate and neighbouring reconstructed samples of one or more neighbouring blocks of the current block;

determine a final candidate from the set of MC candidates based on the boundary matching costs; and encode or decode the current block using the final candidate.

* * * * *